United States Patent
Gross et al.

(10) Patent No.: US 7,918,313 B2
(45) Date of Patent: Apr. 5, 2011

(54) NONWOVEN MATERIAL FOR ACOUSTIC INSULATION, AND PROCESS FOR MANUFACTURE

(75) Inventors: James R. Gross, Cordova, TN (US); Jeffrey S. Hurley, Memphis, TN (US); Brian E. Boehmer, Cordova, TN (US); Ronald Timothy Moose, Lakeland, TN (US)

(73) Assignee: Buckeye Technologies Inc., Memphis, TN (US)

( * ) Notice: Subject to any disclaimer, the term of this patent is extended or adjusted under 35 U.S.C. 154(b) by 1230 days.

(21) Appl. No.: 10/592,067

(22) PCT Filed: Mar. 31, 2006

(86) PCT No.: PCT/US2006/012256
§ 371 (c)(1), (2), (4) Date: Sep. 7, 2006

(87) PCT Pub. No.: WO2006/107847
PCT Pub. Date: Oct. 12, 2006

(65) Prior Publication Data
US 2010/0066121 A1    Mar. 18, 2010

Related U.S. Application Data

(60) Provisional application No. 60/667,873, filed on Apr. 1, 2005, provisional application No. 60/729,264, filed on Oct. 21, 2005.

(51) Int. Cl.
*E04B 1/84*    (2006.01)
(52) U.S. Cl. .......... 181/294; 181/284; 181/286
(58) Field of Classification Search .......... 181/294, 181/284, 286
See application file for complete search history.

(56) References Cited

U.S. PATENT DOCUMENTS

| | | | | |
|---|---|---|---|---|
| 2,610,138 | A | * | 9/1952 | Heritage .......... 264/121 |
| 2,832,745 | A | | 8/1958 | Hechenbleikner |
| D200,773 | S | | 4/1965 | Anderson |
| 3,259,536 | A | | 7/1966 | Yamaguchi et al. |
| 3,424,270 | A | | 1/1969 | Hartman et al. |
| 3,429,728 | A | | 2/1969 | Goldstone et al. |
| 3,485,706 | A | * | 12/1969 | Evans .......... 428/134 |

(Continued)

FOREIGN PATENT DOCUMENTS

EP    070164    1/1983

(Continued)

OTHER PUBLICATIONS

Morphology of Wood Pulp Fiber from Softwoods and Influence on Paper Strength; Richard A. Horn; U.S. Department of Agriculture, Forest Service, Research paper; FPL 242; (1974).

(Continued)

*Primary Examiner* — Elvin G Enad
*Assistant Examiner* — Forrest M Phillips
(74) *Attorney, Agent, or Firm* — Baker Botts L.L.P.

(57) ABSTRACT

An improved acoustically and thermally insulating composite material suitable for use in structures such as buildings, appliances, and the interior passenger compartments and exterior components of automotive vehicles, comprising at least one airlaid fibrous layer of controlled density and composition and incorporating suitable binding agents and additives as needed to meet expectations for noise abatement, fire, and mildew resistance. Separately, an airlaid structure which provides a reduced, controlled airflow therethrough useful for acoustic insulation is provided, and which includes a woven or nonwoven scrim.

83 Claims, 2 Drawing Sheets

U.S. PATENT DOCUMENTS

| | | | |
|---|---|---|---|
| 3,536,557 A | 10/1970 | Goldstone | |
| 3,844,813 A | 10/1974 | Leonard et al. | |
| 3,955,032 A | 5/1976 | Mischutin | |
| 4,026,808 A | 5/1977 | Duffy | |
| 4,035,215 A | 7/1977 | Goldstone | |
| 4,056,161 A | 11/1977 | Allen | |
| 4,131,664 A | 12/1978 | Flowers et al. | |
| 4,324,831 A | 4/1982 | Parrini et al. | |
| 4,420,526 A | 12/1983 | Schilling et al. | |
| 4,442,164 A | 4/1984 | Briggs et al. | |
| 4,568,581 A | 2/1986 | Peoples, Jr. | |
| 4,600,606 A | 7/1986 | Mischutin | |
| 4,702,861 A | 10/1987 | Farnum | |
| 4,776,854 A | 10/1988 | Ogawa et al. | |
| 4,851,283 A | 7/1989 | Holtrop et al. | |
| 4,851,291 A * | 7/1989 | Vigo et al. | 428/393 |
| 4,966,799 A | 10/1990 | Lucca et al. | |
| 5,051,110 A | 9/1991 | Borrell et al. | |
| 5,055,341 A | 10/1991 | Yamaji et al. | |
| 5,064,714 A | 11/1991 | Yamaguchi et al. | |
| 5,068,001 A | 11/1991 | Haussling | |
| 5,141,784 A | 8/1992 | Beane et al. | |
| 5,200,457 A | 4/1993 | Vasishth et al. | |
| 5,246,772 A * | 9/1993 | Manning | 442/364 |
| 5,266,143 A | 11/1993 | Albera et al. | |
| 5,286,929 A | 2/1994 | Kazama et al. | |
| 5,296,657 A | 3/1994 | Gilliland et al. | |
| 5,379,568 A | 1/1995 | Murray | |
| 5,401,793 A | 3/1995 | Kobayashi et al. | |
| 5,422,170 A | 6/1995 | Iwata et al. | |
| 5,491,186 A | 2/1996 | Kean et al. | |
| 5,492,881 A | 2/1996 | Diamond | |
| 5,516,580 A | 5/1996 | Frenette et al. | |
| 5,534,301 A * | 7/1996 | Shutt | 427/377 |
| 5,554,831 A | 9/1996 | Matsukawa et al. | |
| 5,591,289 A | 1/1997 | Souders et al. | |
| 5,646,077 A | 7/1997 | Matsunaga et al. | |
| 5,695,528 A | 12/1997 | Komori et al. | |
| 5,721,281 A | 2/1998 | Blount | |
| 5,773,375 A | 6/1998 | Swan et al. | |
| 5,811,359 A | 9/1998 | Romanowski | |
| 5,817,408 A | 10/1998 | Orimo et al. | |
| 5,841,081 A | 11/1998 | Thompson et al. | |
| 5,843,889 A | 12/1998 | Thompson et al. | |
| 5,886,306 A * | 3/1999 | Patel et al. | 181/290 |
| RE36,323 E | 10/1999 | Thompson et al. | |
| 5,971,099 A | 10/1999 | Yasuda et al. | |
| 6,102,465 A | 8/2000 | Nemoto et al. | |
| 6,109,389 A | 8/2000 | Hiers et al. | |
| 6,145,617 A | 11/2000 | Alts | |
| 6,153,668 A | 11/2000 | Gestner et al. | |
| 6,271,156 B1 * | 8/2001 | Gleason et al. | 442/413 |
| 6,296,075 B1 | 10/2001 | Gish et al. | |
| 6,296,076 B1 | 10/2001 | Hiers et al. | |
| 6,297,176 B1 | 10/2001 | North et al. | |
| 6,309,565 B1 | 10/2001 | Stowell et al. | |
| 6,358,591 B1 * | 3/2002 | Smith | 428/74 |
| 6,475,315 B1 | 11/2002 | Kean et al. | |
| 6,524,691 B2 * | 2/2003 | Sugawara et al. | 428/292.4 |
| 6,534,145 B1 | 3/2003 | Boyles | |
| 6,617,382 B1 | 9/2003 | Tilton et al. | |
| 6,631,785 B2 | 10/2003 | Khambete et al. | |
| 6,667,254 B1 | 12/2003 | Thompson, Jr. et al. | |
| 6,669,265 B2 | 12/2003 | Tilton et al. | |
| 6,726,980 B2 | 4/2004 | Staelgraeve et al. | |
| 6,746,976 B1 * | 6/2004 | Urankar et al. | 442/155 |
| 6,802,389 B2 | 10/2004 | Tompson et al. | |
| 6,893,711 B2 | 5/2005 | Williamson et al. | |
| 7,000,729 B2 | 2/2006 | Jacobsen | |
| RE39,010 E | 3/2006 | Gish et al. | |
| 7,055,649 B2 | 6/2006 | Tompson et al. | |
| 7,080,712 B2 | 7/2006 | Tsuiki et al. | |
| 7,137,477 B2 | 11/2006 | Keller et al. | |
| 7,150,059 B2 | 12/2006 | Small et al. | |
| 7,157,117 B2 | 1/2007 | Mikhael et al. | |
| 7,226,656 B2 | 6/2007 | Coates et al. | |
| 2001/0051247 A1 | 12/2001 | Waitkus et al. | |
| 2002/0042237 A1 | 4/2002 | Sameshima et al. | |
| 2002/0137421 A1 | 9/2002 | Desroches et al. | |
| 2003/0012883 A1 | 1/2003 | Yu et al. | |
| 2003/0106741 A1 | 6/2003 | Tompson et al. | |
| 2003/0176131 A1 | 9/2003 | Tilton | |
| 2004/0023587 A1 | 2/2004 | Bargo, II | |
| 2004/0028958 A1 | 2/2004 | Assink et al. | |
| 2004/0050619 A1 | 3/2004 | Bargo, II | |
| 2004/0102112 A1 | 5/2004 | McGuire et al. | |
| 2004/0110438 A1 | 6/2004 | Tompson et al. | |
| 2004/0121114 A1 | 6/2004 | Piana et al. | |
| 2004/0121683 A1 | 6/2004 | Jordan et al. | |
| 2004/0121691 A1 * | 6/2004 | Klein | 442/389 |
| 2004/0163724 A1 | 8/2004 | Trabbold et al. | |
| 2004/0176003 A1 | 9/2004 | Yang et al. | |
| 2004/0180599 A1 | 9/2004 | Yang et al. | |
| 2004/0192139 A1 | 9/2004 | Pallach et al. | |
| 2004/0226100 A1 | 11/2004 | Small et al. | |
| 2004/0231915 A1 | 11/2004 | Thompson et al. | |
| 2004/0238275 A1 | 12/2004 | Keller et al. | |
| 2004/0248490 A1 | 12/2004 | Hyuga et al. | |
| 2005/0020159 A1 | 1/2005 | Zucker | |
| 2005/0031819 A1 | 2/2005 | Mankell et al. | |
| 2005/0066691 A1 | 3/2005 | Ruid et al. | |
| 2005/0126848 A1 | 6/2005 | Siavoshai et al. | |
| 2005/0164582 A1 | 7/2005 | McGuire et al. | |
| 2005/0210584 A1 | 9/2005 | Lim et al. | |
| 2005/0227558 A1 | 10/2005 | Small et al. | |
| 2005/0250406 A1 | 11/2005 | Wenstrup et al. | |
| 2005/0269850 A1 | 12/2005 | York et al. | |
| 2006/0000024 A1 | 1/2006 | McGuire et al. | |
| 2006/0065482 A1 | 3/2006 | Schmidft et al. | |
| 2006/0068675 A1 | 3/2006 | Handermann et al. | |
| 2006/0090832 A1 | 5/2006 | Allison et al. | |
| 2006/0090958 A1 | 5/2006 | Coates et al. | |
| 2006/0105928 A1 | 5/2006 | Crooks et al. | |
| 2006/0113146 A1 | 6/2006 | Khan et al. | |
| 2006/0160454 A1 | 7/2006 | Handermann et al. | |
| 2006/0228528 A1 | 10/2006 | Link et al. | |
| 2006/0240217 A1 | 10/2006 | Foss et al. | |
| 2006/0289231 A1 * | 12/2006 | Priebe et al. | 181/290 |
| 2007/0014960 A1 | 1/2007 | Emanuel et al. | |
| 2007/0048512 A1 | 3/2007 | Mikhael et al. | |
| 2007/0175195 A1 | 8/2007 | Skirius et al. | |
| 2008/0008858 A1 | 1/2008 | Hong et al. | |
| 2008/0022645 A1 | 1/2008 | Skirius et al. | |
| 2008/0050565 A1 * | 2/2008 | Gross et al. | 428/212 |
| 2008/0054231 A1 | 3/2008 | Wenstrup et al. | |
| 2008/0073146 A1 | 3/2008 | Thompson et al. | |
| 2008/0082151 A1 | 4/2008 | Quincy et al. | |
| 2008/0121461 A1 * | 5/2008 | Gross et al. | 181/286 |
| 2009/0019825 A1 | 1/2009 | Skirius et al. | |

FOREIGN PATENT DOCUMENTS

| | | |
|---|---|---|
| EP | 1182087 A | 2/2002 |
| EP | 1612768 A | 1/2006 |
| WO | WO8904886 | 6/1989 |
| WO | WO9207985 | 5/1992 |
| WO | WO9526228 | 10/1995 |
| WO | WO 2004/086354 | 10/2004 |
| WO | WO2006052581 | 5/2006 |

OTHER PUBLICATIONS

U.S. Appl. No. 11/541,320, filed Oct. 5, 2009, Response to Non-Final Rejection.

U.S. Appl. No. 11/541,320, filed Apr. 13, 2009, Non-Final Rejection.

U.S. Appl. No. 11/541,320, filed Dec. 19, 2009, Resposne to Non-Final Rejection.

U.S. Appl. No. 11/541,320, filed Sep. 22, 2008, Non-Final Rejection.

U.S. Appl. No. 11/772,628, filed Apr. 28, 2009, Non-Final Rejection.

U.S. Appl. No. 11/772,628, filed October 19, 2009, Response to Non-Final Rejection.

U.S. Appl. No. 11/772,628, filed Feb. 1, 2010, Non-Final Office Action.

U.S. Appl. No. 11/541,320, filed Jan. 15, 2010, Final Office Action.

* cited by examiner

Fig. 6 Normal Incidence Sound Absorption Coeffient
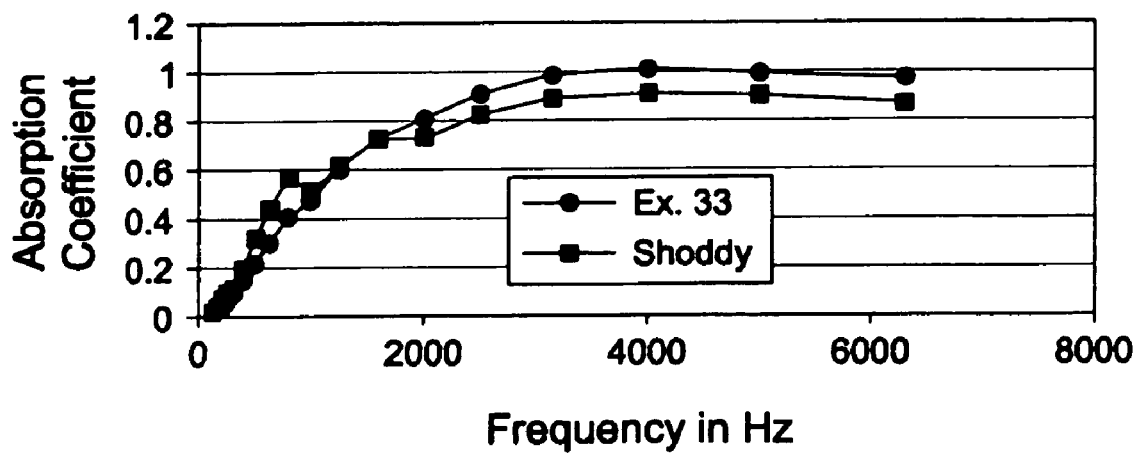

NONWOVEN MATERIAL FOR ACOUSTIC INSULATION, AND PROCESS FOR MANUFACTURE

STATEMENT OF RELATED APPLICATIONS

The present application claims priority under 35 U.S.C. §119(a) to a previous application filed pursuant to the Patent Cooperation Treaty. That application was filed with the United States Patent and Trademark Office as the Receiving Office on Mar. 31, 2006. The application was assigned Serial No. PCT/US2006/012256, and was entitled "Nonwoven Material for Acoustic Insulation, and Process for Manufacture." The PCT application is incorporated herein by reference in its entirety.

The PCT application claimed priority to Provisional Patent Application Ser. No. 60/667,873 filed in the United States on Apr. 1, 2005. That application is entitled "Material for Acoustic and Thermal Insulation." The provisional application is incorporated herein by reference in its entirety.

The PCT application also claimed priority to Provisional Patent Application Ser. No. 60/729,264 filed in the United States on Oct. 21, 2005. That application is entitled "Nonwoven Structure, and Process for Manufacture." The provisional application is incorporated herein by reference in its entirety.

BACKGROUND OF THE INVENTION

1. Field of the Invention

The present invention relates to nonwoven materials that have superior acoustic and thermal insulation characteristics. The invention further relates to processes for the production of such nonwoven materials. The invention further relates to airlaid structures which provide a reduced, controlled airflow therethrough useful for acoustic insulation. Still further, the invention pertains to the acoustic insulation of automobiles.

Certain aspects of the invention relate to the manufacture of acoustic panels and padding for automobiles, such as dash panel liners or mats, engine side firewall insulation, engine side hood insulation, interior wheel well insulation, trunk compartment trim insulation, flooring underlayment, package trays, and door panels. The present invention further relates to sound insulation for major appliances, such as dishwashers and washing machines, and sound and thermal insulation of exterior and interior walls, ceilings, and floors of buildings.

2. Description of the Related Art

The interior of an automobile is desirably insulated from annoying sounds, which may be transmitted through the frame and body of the automobile. These sounds typically originate from the tires as they interact with the road surface, from external wind, or from the operation of the engine and other mechanical parts of the automobile. These sounds have frequencies ranging from a few Hertz (Hz) up to several thousand Hz.

A variety of materials have been used in the fabrication of acoustic blankets. The blankets are designed and configured to be installed against surfaces of structural panels of an automotive vehicle. The insulating blankets, or pads, serve to dampen, block, absorb or attenuate unwanted road noise and external sounds. Most commonly, these blankets are comprised of recycled textile fibers formed into a material called shoddy. In some instances, foam materials may be used.

While those skilled in the art recognize that a sound absorber is most effective at a thickness corresponding to one fourth of the wavelength of the frequency of sound to be absorbed, practical considerations of space and cost may limit the actual thickness of the insulating composites which can be employed. With shoddy used in automobiles, a practical upper limit of insulating composite thickness is often thought to be approximately 25 mm (one inch) since the shoddy tends to be dense and heavy. Therefore, it is known in the art to apply an acoustical insulating barrier, sometimes called a heavy layer or viscoelastic layer, to the shoddy material for overall improved efficiency of sound reduction. Such a barrier material may double as carpeting attachment, or be included in the carpet fabrication. See, for example, U.S. Pat. Nos. 4,056,161; 4,966,799; 5,266,143; 5,068,001; and 6,109,389. Asphalt compositions, which are highly filled with dense inert powder, usually of a mineral nature, are applied in a molten state as disclosed in U.S. Pat. No. 3,429,728. Thermosetting resins like melamine, phenol-aldehydes, and urea resins are taught in U.S. Pat. No. 3,536,557, and dense filled vinyl plastisols are disclosed in U.S. Pat. No. 4,035,215. A variety of thermosetting and thermoplastic barrier materials are used in U.S. Pat. No. 4,131,664 to create the heavy or dense barrier layer. Also, a polymeric sound blocking material is disclosed in U.S. Pat. No. 3,424,270, which is hereby incorporated by reference in its entirety.

A drawback to the acoustical dampening materials disclosed in many of these patents is that they contribute significant weight to the vehicle. Those skilled in the art of acoustics understand that the best sound barrier is oftentimes a heavy, dense material like lead sheeting. However, a few pinholes or cracks can compromise even a thick or heavy sound barrier.

In lieu of sound barriers, sound absorbers, have been used. Sound absorbers typically are significantly less dense than barrier materials, and may actually be quite porous. As a result, their acoustic performance is less affected by pinholes. In addition to absorbing the sound energy, other mechanisms of reducing the perceived sound are to dampen and to block the sound waves. Although structural insulation requirements differ from automotive, the technical learnings of the one apply directly to the other.

In the final analysis, the actual physical mechanism of sound reduction (blocking or absorption) does not matter. The human ear or even a microphone cannot tell if a transmitted sound has been partially blocked or partially absorbed. In applications with numerous penetrations of the acoustic and structural panels, as in the firewall of an automobile, a sound-absorbing material may actually outperform a barrier material since the gaskets around the penetrations must be nearly perfect for the barrier material to be highly efficient in blocking the incident sound.

Routinely in the manufacture of vehicles, fibrous panels are die cut and/or molded under heat and pressure to impart a shape-sustaining contour to uniquely conform to the sheet metal of each make and model of vehicle. The molding operation can involve a heated die and cold material or the acoustic material itself is heated and then pressed in a cold die.

Criteria in the manufacture and use of sound absorbing and blocking composites, pads, baits, or blankets have been the cost of the textile raw material itself, the cost of processing into heavyweight nonwoven blankets, and the ease by which such blankets can be custom-molded to fit precisely against the structural panels of the vehicle. Other technical parameters of importance have been the acoustical properties of such fibrous nonwovens, their weight, and their durability over prolonged service during which time they may be subjected to wide variations in heat and humidity and quite possibly exposure to solvent or water-based adhesives.

Reducing the size and weight of vehicles has long been known to be effective in improving gas mileage. However, there have not heretofore been economically viable options for incorporating lighter weight acoustic insulation materials while retaining the expected level of sound-insulating performance. It is proposed here to offer nonwoven structures as a lighter alternative for acoustic insulation. In addition, it is proposed to offer nonwoven structures that provide a reduced, controlled airflow therethrough. In one aspect, the structures are airlaid structures.

SUMMARY OF THE INVENTION

The benefits and advantages of the present invention are achieved by a nonwoven material having acoustical and thermal insulating properties. The nonwoven material could also be characterized as a composite fibrous material, pad, or batting. The base material is referred to interchangeably herein as the "fibrous material," "core" or "base pad." A binding material is placed within the fibers of the core to hold the fibers in place.

In one aspect, the core defines one or more fibrous layers, each layer of which has a defined but not necessarily identical density or composition. Each of the fibrous layers has a fibrous mass of substantially uniform density and thickness over the major area thereof. The fibers are held by a thermoplastic binder, a thermosetting binder, or a combination thereof. The binder is present in amounts ranging from as low as about 0.5 percent up to about 50 percent by weight based on the total weight of the fibrous layers making up the core. Preferably, the binder is present in a range of from about 5 to about 60 percent by weight.

In addition to the core, the nonwoven material may further include integral particles such as a mildewcide, a fire retardancy, or thermoset resins. The core may also have an auxiliary layer comprising a polymer film or a carrier sheet attached to an outer surface. The polymer film may have a dense particulate-filled latex or other binder therein to form a "heavy layer." Preferably, the filler will produce a viscoelastic polymer coating to act as a sound blocking material or reflective mass to further enhance the acoustic properties of the base pad.

The present disclosure also offers methods of economically producing an acoustical insulating material on a commercial scale using a conventional airlaid machine. In a preferred continuous process for the production of the nonwoven material, fibrous layers are formed sequentially on an airlaid machine having three or more forming heads so that the layers are integrally united to each other at the interfaces of the layers to form a core, or base pad. An airlaid pad can also be produced by means of multiple passes through a machine with one or two heads. Auxiliary layers may then be added to the base pad on one or both major surfaces or as a discrete layer within the core. In this way the critical sound insulating quality of the nonwoven material is obtained at a substantial reduction in weight as compared to the conventional reclaimed textile materials know as shoddy.

The various nonwoven materials of the present invention are particularly good sound absorbers for their weight. This is demonstrated by sample performance in unique Laboratory Sound Transmission Tests (LSTT). This laboratory screening test uses an amplified source of "white noise" on one side of the sample and the microphone of the decibel meter on the other side of the sample. A noise reduction of 5-15 dB from an incident 90 dB sound level was achieved. Other standardized acoustic tests also show the superior performance per unit of weight of these airlaid materials. For example, an Impedance Tube Sound Absorption Test, either as ASTM E1050-98 with two microphones, or as ASTM C384 with a single movable microphone, has been conducted. Such test covers a broad frequency range of from 100 to 6300 Hz.

A main difference between the standard acoustic tests and the LSTT screening test is that with the Impedance Tube Sound Absorption Test, the microphone(s) is/are on the same side of the sample as the sound source, whereas with the LSTT the sample is between the microphone and the sound source. The Impedance Tube Sound Absorption Test also records details on frequency-related acoustic properties while the LSTT only measures the loudness of the white noise.

In one embodiment, an airlaid web of fibrous material is sprayed with a latex binder or coating while still within the airlaid machine and prior to passage through a drying oven. In this way, an auxiliary layer is produced. Optionally, this latex is the carrier for dense fine powder filler, such as, for example, calcium carbonate or barium sulfate. The fillers are chosen based on their insolubility in water, cost, density, available particle size, and chemical and physical stability under the expected conditions of processing and use.

In one embodiment, a nonwoven material comprising a core or base pad is provided. The core is a fibrous material containing:

(A) from about 95 weight percent to about 40 weight percent matrix fibers; and (B) from about 60 weight percent to about 5 weight percent core binder, where weight percentages in the core are based on the total weight of the core; and where:

(C) the core has a basis weight of from about 200 gsm to about 3000 gsm;

(D) the base pad has a density of from about 0.015 g/cm$^2$ to about 0.10 g/cm$^2$; and (E) the nonwoven material has sound transmission reduction of 5 decibel or greater in an LSTT sound transmission test.

Optionally, the nonwoven material further comprises:

(F) a woven or nonwoven carrier with a basis weight of from about 10 gsm to about 2000 gsm which is integral with a surface of the nonwoven material.

The nonwoven material may further comprise:

(G) an auxiliary layer containing plastic material with a basis weight of from about 50 gsm to about 400 gsm present on an outer surface of the nonwoven material or present as a discrete inner layer within the core of the nonwoven material.

Alternative embodiments of the nonwoven material may further comprise:

(H) a fire retardant; and (I) a waterproofing agent.

Another aspect of this invention is a panel of the nonwoven material having an area of 10, 25, or even 50 meters square, or less. The panel is molded through application of heat and pressure into a shape which is retained.

Within the scope of this invention, is a thermal insulating construct comprising a structural member or surface of a building, a vehicle, or an appliance and attached or applied thereto a nonwoven material as described above. Another embodiment of this invention relates to a sound attenuating laminate comprising the nonwoven material described above as attached or applied thereto or otherwise in contact therewith upholstery material, carpeting or a structural member or surface. The nonwoven material may be molded with the application of heat and pressure into a shape which is retained.

Another embodiment of this invention is a package for an object comprising a container and a nonwoven material as described above.

Within the scope of this invention is a process for the production of a nonwoven material comprising:

(1a) on a moving foraminous wire from one or more forming heads, depositing a mixture containing:

(A) from about 95 weight percent to about 40 weight percent matrix fibers;

(B) from about 60 weight percent to about 5 weight percent core binder, to form a core of the nonwoven material, where weight percentages on the total weight of the core, followed by:

(2a) heating the nonwoven material to consolidate the mixture of matrix fibers and binder; or, (1b) depositing on a moving foraminous wire:

(A) a woven or nonwoven carrier with a basis weight of from about 10 gsm to about 2000 gsm; followed by (2b) depositing on the carrier from one or more forming heads a mixture containing:

(B) from about 95 weight percent to about 40 weight percent matrix fibers, and (C) from about 60 weight percent to about 5 weight percent core binder, to form a base pad of the nonwoven material, where weight percentages are based on the total weight of the core, and so that the carrier is integral with a surface of the nonwoven material, followed by:

(3) heating the nonwoven material to consolidate the mixture of matrix fibers and binder, where:

(D) the core has a basis weight of from about 200 gsm to about 3000 gsm, (E) the core has a density of from about 0.015 g/cm$^2$ to about 0.10 g/cm$^2$, and (F) the nonwoven material has sound transmission reduction of 5 decibel or greater in an LSTT sound transmission test.

The process may further comprise:

(4) forming an auxiliary layer containing plastic material with a basis weight of from about 50 gsm to about 400 gsm present:

(A) on an outer surface of the core, or (B) present as a discrete inner layer within the core of the nonwoven material.

Preferably, these processes are continuous airlaid processes.

Another aspect to the nonwoven material disclosed herein is the placement of a thin and light weight "scrim" along a surface of a nonwoven fibrous material. In one embodiment, a nonwoven structure is offered comprising:

(A) a scrim with an interior surface and an outer surface, the scrim having a basis weight of from about 8 gsm to about 200 gsm; and (B) in contact with the interior surface of the scrim, an interior surface of a nonwoven material having an interior surface and an outer surface, the nonwoven material having a basis weight of from about 10 gsm to about 2000 gsm which contains from about 30 weight percent to about 95 weight percent matrix fibers and from about 5 weight percent to about 70 weight percent of a binder where the weight percentages are based on the total weight of the nonwoven material;

(C) deposited on the outer surface of the scrim, from about 1 gsm to about 40 gsm of a polymeric coating; and, optionally (D) deposited on the outer surface of the nonwoven material from about 1 gsm to about 40 gsm of a second polymeric coating.

In another embodiment, a nonwoven structure is provided which comprises:

(A) a scrim with a first surface and a second surface, the scrim having a basis weight of from about 8 gsm to about 200 gsm;

(B) deposited on the first surface of the scrim, from about 1 gsm to about 40 gsm of a polymeric coating; and, optionally, (C) deposited on the second surface of the scrim from about 1 gsm to about 40 gsm of a second polymeric coating.

Also within the scope of the inventions is a process for the production of a nonwoven structure comprising;

(1) providing a scrim with an interior surface and an outer surface;

(2) airlaying a nonwoven material on the interior surface of the scrim, the nonwoven material having a basis weight of from about 10 gsm to about 2000 gsm which contains from about 30 weight percent to about 95 weight percent matrix fibers and from about 5 weight percent to about 70 weight percent of a binder where the weight percentages are based on the total weight of the nonwoven material;

(3) depositing on the outer surface of the scrim, from about 1 gsm to about 40 gsm of a polymeric coating; and, optionally, (4) depositing on the outer surface of the nonwoven material from about 1 gsm to about 40 gsm of a second polymeric coating.

The nonwoven materials and structures have utility as an acoustic insulator in automobiles. In addition to the utility of the nonwoven in automobiles, materials and structures are also effective in moderating the sound emanating from major appliances and in providing acoustic insulation to buildings and office cubicle areas. Using airlaid insulation in walls, floors and ceilings is also within the scope of this aspect of the invention.

For some uses, the fibrous nonwoven material is subjected to a molding operation to create contoured parts unique to each different application, such as, for example, different makes and models of automobiles or major appliances. While under the heated and pressurized condition, the binding agents in the fibrous core are set or cured so as to retain the custom shape. Thereafter, the pressure is released and the panel is extracted from the mold.

Usually, the fibrous material will be treated to render it resistant to mildew and to make it fire retardant or even self-extinguishing. For some applications in which it is desirable that the insulation material is water resistant or waterproof, the application of a water resisting agent such as, for example, paraffin or silicone oil is used.

BRIEF DESCRIPTION OF THE DRAWINGS

So that the manner in which the above recited features of the present invention can be better understood, certain drawings are appended hereto. It is to be noted, however, that the appended drawings illustrate only selected embodiments of the inventions and are therefore not to be considered limiting of scope, for the inventions may admit to other equally effective embodiments and applications.

FIG. 1 is a cross-sectional view of a homogeneous airlaid base pad.

FIG. 2 is a cross-sectional view of the pad of FIG. 1, having a single layer of moldable thermoplastic or thermosetting polymeric binder applied to one side of the airlaid pad. In this way, an airlaid structure is formed.

FIG. 3 is an alternate arrangement for an airlaid, nonwoven structure. FIG. 3 shows a cross-sectional view of the pad of FIG. 1 having a layer of the polymeric binder applied to both sides of the pad.

FIG. 4 is an alternate arrangement for an airlaid, nonwoven structure. FIG. 4 shows a cross-sectional view of the pad of FIG. 1, with one side of the base pad receiving a layer of polymeric binder, while the other receives a "heavy" layer. A dense filler is dispersed in a polymeric binder to form the heavy layer.

FIG. 5 is yet another alternate arrangement for an airlaid, nonwoven structure. FIG. 5 provides a cross-sectional view of the pad of FIG. 1, with the heavy layer being applied to one side of the airlaid pad.

FIG. 6 is a Cartesian coordinate showing a Normal Incidence Sound Absorption Coefficient. Frequency is charted against absorption coefficient.

DETAILED DESCRIPTION

Definitions

As used herein, the terms "fibrous material" and "matrix fiber" refer to a synthetic or cellulosic fiber.

"Scrim" means any fibrous woven or nonwoven layer of material. The scrim may be used as a carrier sheet in an airlaid process, or may be combined with a pre-formed airlaid or other nonwoven material in a converting process. In some instances, the terms carrier and scrim are interchangeable.

Laboratory Sound Transmission Test, or LSTT, refers to a laboratory screening test that uses an amplified source of "white noise" on one side of a pad sample, and a microphone of the decibel meter on the other side of the sample. An incident 90 dB sound level is utilized.

"Core" means a base fibrous material, and is referred to interchangeably herein as the "fibrous material," "core" or "base pad."

Description of Specific Embodiments

Figure 1:
FIGS. 1-5 are cross-sectional views of nonwoven, airlaid materials in various embodiments.

FIGS. 1-5 are cross-sectional views of nonwoven, airlaid materials in various embodiments. First, FIG. 1 presents a cross-sectional view of a homogeneous base pad or "core" 10. The airlaid pad 10 defines a nonwoven, airlaid structure fabricated from matrix fibers and a core binder. "Matrix fiber" refers to both synthetic and cellulosic fibers. Preferably, the fibers do not melt or dissolve to any degree during the forming or bonding of the pad and any auxiliary layers or materials.

A wide variety of natural and synthetic fibers is suitable for use as matrix fibers for the pad 10. Preferred matrix fibers are cellulosic fibers, though matrix fibers may also be synthetic fibers or a mixture of cellulosic and synthetic fibers.

Cellulosic fibrous materials suitable for use in the present invention include both softwood fibers and hardwood fibers. See M. J. Kocurek & C. F. B. Stevens, *Pulp and Paper Manufacture—Vol. 1: Properties of Fibrous Raw Materials and Their Preparation for Pulping*, The Joint Textbook Committee of the Paper Industry, pp. 182 (1983), which is hereby incorporated by reference in its entirety. Exemplary, though not exclusive, types of softwood pulps are derived from slash pine, jack pine, radiata pine, loblolly pine, white spruce, lodgepole pine, redwood, and Douglas fir. North American southern softwoods and northern softwoods may be used, as well as softwoods from other regions of the world. Hardwood fibers may be obtained from oaks, genus *Quercus*, maples, genus *Acer*, poplars, genus *Populus*, or other commonly pulped species. In general, softwood fibers are preferred due to their longer fiber length as measured by T 233 cm-95, and southern softwood fibers are most preferred due to a higher coarseness as measured by T 234 cm-84, which leads to greater intrinsic fiber strength as measured by breaking load relative to either northern softwood or hardwood fibers.

Other suitable cellulose fibers include those derived from Esparto grass, bagasse, jute, ramie, kenaff, sisal, abaca, hemp, flax and other lignaceous and cellulosic fiber sources. Also available are cotton linter pulp, chemically modified cellulose such as cross-linked cellulose fibers, and highly purified cellulose fibers such as Buckeye HPF. Such fibers are available from Buckeye Technologies Inc. of Memphis, Tenn.

The fibrous material may be prepared from its natural state by any pulping process. Such processes include chemical, mechanical, thermomechanical (TMP) and chemithermomechanical pulping (CTMP). These industrial processes are described in detail in R. G. Macdonald & J. N. Franklin, *Pulp and Paper Manufacture in 3 volumes; 2$^{nd}$ Edition, Volume 1: The Pulping of Wood*, 1969; *Volume 2: Control, Secondary Fiber, Structural Board, Coating*, 1969, *Volume 3: Papermaking and Paperboard Making*, (1970), The joint Textbook Committee of the Paper Industry, and in M. J. Kocurek & C. F. B. Stevens, *Pulp and Paper Manufacture, Vol. 1: Properties of Fibrous Raw Materials and Their Preparation for Pulping*, The Joint Textbook Committee of the Paper Industry, p. 182 (1983). Both of these references are hereby incorporated by reference in their entirety.

The cellulose fiber used as a matrix fiber for the pad 10 may be derived from a source which is one or more of Southern Softwood Kraft, Northern Softwood Kraft, hardwood, eucalyptus, mechanical, recycle and rayon. Preferably, Southern Softwood Kraft, Northern Softwood Kraft, or a mixture thereof is used. More preferably, Southern Softwood Kraft is used. Preferably, the fibrous material forming the pad 10 is prepared by a chemical pulping process, such as a Kraft or sulfite process. The Kraft process is particularly preferred. Pulp prepared from a southern softwood by a Kraft process is often called SSK. In a similar manner, southern hardwood, northern softwood and northern hardwood pulps are designated SHK, NSK & NHK, respectively. Bleached pulp, which is fibers that have been delignified to very low levels of lignin, are preferred, although unbleached Kraft fibers may be used in some applications due to lower cost, especially if alkaline stability is not an issue.

Crosslinked cellulose fibers, also known in the industry as curly fibers, are also advantageous in this invention, particularly when it is desired to achieve extremely high caliper (thickness) of the nonwoven material and retain resiliency of the structure 10. Crosslinked fibers are described in U.S. Pat. Nos. 4,898,462; 4,889,595; 4,888,093; 4,822,453, all of which are hereby incorporated by reference in their entirety. Recycled cellulose fibers from cardboard and newsprint are further sources, as long as the recycled fibers can be individualized sufficiently to enter the air-stream of the airlaid machine.

The cellulose fibers may be blended with synthetic fibers such as polyester, nylon, polyethylene or polypropylene. Synthetic fibers suitable for use as a matrix fiber include cellulose acetate, polyolefins (including polyethylene and polypropylene), nylon, polyester (including polyethylene terephthalate (PET)), vinyl chloride, and regenerated cellulose such as viscose rayon, glass fibers, ceramic fibers, and the various bicomponent fibers known in the art. While bicomponent fibers may serve as matrix fibers in the nonwoven material of this invention, they will be more fully described and discussed below in the context of their role as a binder fiber.

Other synthetic fibers suitable for use in various embodiments as matrix fibers or as bicomponent binder fibers include fibers made from various polymers including, by way of example and not by limitation, acrylic, polyamides (such as, for example, Nylon 6, Nylon 6/6, Nylon 12, polyaspartic acid, polyglutamic acid, and so forth), polyamines, polyimides, polyamides, polyacrylics (such as, for example, polyacrylamide, polyacrylonitrile, esters of methacrylic acid and acrylic acid, and so forth), polycarbonates (such as, for example, polybisphenol A carbonate, polypropylene carbonate, and so forth), polydienes (such as, for example, polybutadiene, polyisoprene, polynorbomene, and so forth), polyepoxides, polyesters (such as, for example, polyethylene terephthalate, polybutylene terephthalate, polytrimethylene terephthalate, polycaprolactone, polyglycolide, polylactide, polyhydroxybutyrate, polyhydroxyvalerate, polyethylene adipate, polybutylene adipate, polypropylene succinate, and so forth), polyethers (such as, for example, polyethylene glycol (polyethylene oxide), polybutylene glycol, polypropylene oxide, polyoxymethylene (paraformaldehyde), polytetramethylene ether (polytetrahydrofuran), polyepichlorohydrin, and so forth), polyfluorocarbons, formaldehyde polymers (such as, for example, urea-formaldehyde, melamine-formaldehyde, phenol formaldehyde, and so forth), natural polymers (such as, for example, cellulosics, chitosans, lignins, waxes, and so forth), polyolefins (such as, for example, polyethylene, polypropylene, polybutylene, polybutene, polyoctene, and so forth), polyphenylenes (such as, for example, polyphenylene oxide, polyphenylene sulfide, polyphenylene ether sulfone, and so forth), silicon containing polymers (such as, for example, polydimethyl siloxane, polycarbomethyl silane, and so forth), polyurethanes, polyvinyls (such as, for example, polyvinyl butyral, polyvinyl alcohol, esters and ethers of polyvinyl alcohol, polyvinyl acetate, polystyrene, polymethylstyrene, polyvinyl chloride, polyvinyl pyrrolidone, polymethyl vinyl ether, polyethyl vinyl ether, polyvinyl methyl ketone, and so forth), polyacetals, polyarylates, and copolymers (such as, for example, polyethylene-co-vinyl acetate, polyethylene-co-acrylic acid, polybutylene terephthalate-co-polyethylene terephthalate, polylauryllactam-block-polytetrahydrofuran, and so forth).

The matrix fibers desirably are present in the base pad in an amount of from about 30 percent by weight to about 95 percent by weight based on the total weight of the core or pad material 10. More desirably, the matrix fibers are present in the core in an amount of from about 40 weight percent to about 95 percent by weight based on the total weight of the pad 10; or, desirably, in an amount from about 55 percent to about 90 percent by weight; preferably still, in an amount of about 60 percent by weight to about 80 percent by weight.

The matrix fibers are held by a binder. The purpose of the binder when present is to consolidate and hold the material together. The matrix fibers and binder together form the core or base pad 10.

Binders suitable for use in the nonwoven material may be various bicomponent binder fibers or mixtures thereof, various latices or mixtures thereof, or bicomponent fibers or mixtures thereof in combination with various latices or mixtures thereof, which may be thermoplastic, thermosetting or a mixture thereof. Thermoplastic powders may be used in various embodiments, and may be included in the nonwoven fibrous material as a fine powder, chips, or in granular form.

Bicomponent fibers having a core and sheath are known in the art. Many varieties are used in the manufacture of nonwoven materials, particularly those produced by airlaid techniques. Various bicomponent fibers suitable for use in the present invention are disclosed in U.S. Pat. Nos. 5,372,885 and 5,456,982, both of which are hereby incorporated by reference in their entirety. Examples of bicomponent fiber manufacturers include KoSa (Salisbury, N.C.), Trevira (Bobingen, Germany) and ES Fiber Visions (Athens, Ga.).

Useful in various embodiments of this invention are multicomponent fibers having enhanced reversible thermal properties. Such fibers are described in U.S. Pat. No. 6,855,422, which is hereby incorporated by reference in its entirety. Such materials serve as phase changer or temperature regulating materials. Generally, phase change materials have the ability to absorb or release thermal energy to reduce or eliminate heat flow. In general, a phase change material may comprise any substance, or mixture of substances, that has the capability of absorbing or releasing thermal energy to reduce or eliminate heat flow at or within a temperature stabilizing range. The temperature stabilizing range may comprise a particular transition temperature or range of transition temperatures.

An embodiment targeted at the structural thermal insulation market is to use the versatility of an airlaid machine to dose into the airlaid pad 10 fibers, granules or microcapsules that can store heat or cold for release six or eight hours later. The granules reduce the energy bill for a building insulated with such granules.

Phase change materials used in conjunction with various embodiments of the nonwoven structure will be capable of inhibiting a flow of thermal energy during a time when the phase change material is absorbing or releasing heat, typically as the phase change material undergoes a transition between two states, such as, for example, liquid and solid states, liquid and gaseous states, solid and gaseous states, or two solid states. This action is typically transient, and will occur until a latent heat of the phase change material is absorbed or released during a heating or cooling process. Thermal energy may be stored or removed from the phase change material, and the phase change material typically can be effectively recharged by a source of heat or cold. By selecting an appropriate phase change material, the multicomponent fiber may be designed for use in any one of numerous products.

Bicomponent fibers may incorporate a variety of polymers as their core and sheath components. Bicomponent fibers that have a PE (polyethylene) or modified PE sheath typically have a PET (polyethyleneterephthalate) or PP (polypropylene) core. In one embodiment, the bicomponent fiber has a core made of polyester and sheath made of polyethylene. Alternatively, a multi-component fiber with a PP (polypropylene) or modified PP or PE sheath or a combination of PP and modified PE as the sheath or a copolyester sheath wherein the copolyester is isophthalic acid modified PET (polyetheylene therephthalate) typically with a PET or PP core, or a PP sheath—PET core and PE sheath—PP core and co-PET sheath fibers may be employed.

The denier of the fiber preferably ranges from about 1.0 dpf to about 4.0 dpf, and more preferably from about 1.5 dpf to about 2.5 dpf. The length of the fiber is preferably from about 3 mm to about 12 mm, more preferably from about 4.5 mm to about 7.5 mm.

Various geometric configurations can be used for the bicomponent fiber used in the core or base pad 10, including concentric, eccentric, islands-in-the-sea, and side-by-side. The relative weight percentages of the core and sheath components of the total fiber may be varied.

Another type of binder useful in various embodiments of this invention is thermoplastic materials in the form of powders, such as, for example, powdered polyethylene.

Various latex binders are suitable for use in the nonwoven materials and core 10 of this invention. An example is ethyl vinyl acetate copolymers such as AirFlex 124. AirFlex 124 is available from Air Products of Allentown, Pa. AirFlex 124 has about 10 percent solids and about 0.75 percent by weight AEROSOL® OT, which is an anionic surfactant. AEROSOL® OT is available from Cytec Industries of West Paterson, N.J. Other classes of emulsion polymer binders such as styrene-butadiene and acrylic binders may also be used. BINDERS AIRFLEX® 124 and 192 from Air Products, Allentown, Pa., optionally having an opacifier and whitener, such as, for example, titanium dioxide, dispersed in the emulsion may also be used. Other classes of emulsion polymer binders such as styrene-butadiene, acrylic, and carboxylated styrene butadiene acrylonitrile (SBAN) may also be used. A carboxylated SBAN is available as product 68957-80 from Dow Reichhold Specialty Latex LLC of Research Triangle Park, N.C. The Dow Chemical Company, Midland Mich. is a source of a wide variety of suitable latex binders, such as, for example, Modified Styrene Butadiene (S/B) Latexes CP 615NA and CP 692NA, and Modified Styrene Acrylate (S/A) Latexes, such as, for example, CP6810NA. A wide variety of suitable latices are discussed in Emulsion Polymers, Mohamed S. El-Aasser (Editor), Carrington D. Smith (Editor), I. Meisel (Editor), S. Spiegel (Associate Editor), C. S. Kniep (Assistant Editor), ISBN: 3-527-30134-8, from the 217th American Chemical Society (ACS) Meeting in Anaheim, Calif. held in March 1999, and in *Emulsion Polymerization and Emulsion Polymers*, Peter A. Lovell (Editor), Mohamed S. El-Aasser (Editor), ISBN: 0-471-96746-7, published by Jossey-Bass, Wiley. Also useful are various acrylic, styrene-acrylic and vinyl acrylic latices from Specialty Polymers, Inc., 869 Old Richburg Rd., Chester, S.C. 26706. Also useful are Rhoplex™ and Primal™ acrylate emulsion polymers from Rohm and Haas.

In addition to being useful as a binder in the core 10 of the nonwoven material, lattices (not shown) may be used on one or both of the outer surfaces of the material 10 to control dusting. In this application, the amount used would be in the range of from about 2 to about 10 gsm on an individual surface 2.

The core or pad 10 containing the matrix fibers and core binder has a basis weight of from about 200 gsm to about 3000 gsm. In some embodiments, the pad 10 has a basis weight of from about 200 gsm to about 1500 gsm, and in others from about 1600 gsm to about 3000 gsm. In some embodiments the basis weight may range from about 300 gsm to about 3000 gsm; others, from about 400 gsm to about 3000 gsm; others, from about 500 gsm to about 3000 gsm, others from about 600 gsm to about 3000 gsm; others, from about 700 gsm to about 3000 gsm, others from about 800 gsm to about 3000 gsm; others, from about 900 gsm to about 3000 gsm, others from about 1000 gsm to about 3000 gsm; others, from about 1100 gsm to about 3000 gsm, others from about 1200 gsm to about 3000 gsm; others, from about 1300 gsm to about 3000 gsm, others from about 1400 gsm to about 3000 gsm; still others, from about 1500 gsm to about 3000 gsm.

The core or pad 10 desirably has a density of from about 0.015 g/cm$^2$ to about 0.10 g/cm$^2$. More desirably, the pad 10 has a density of from about 0.015 g/cm$^2$ to about 0.06 g/cm$^2$, and in some embodiments from about 0.017 g/cm$^2$ to about 0.045 g/cm$^2$.

In an alternative embodiment, the nonwoven material or core 10 contains a woven or nonwoven carrier with a basis weight of from about 10 gsm to about 2000 gsm. The carrier is integral with a surface 2 of the nonwoven material is not separately shown in FIG. 1. For illustrative purposes, the carrier would look like layer 11 in FIG. 1, but would be beneath the core 10.

A wide variety of nonwoven carriers known in the art made from either cellulose fibers or synthetic fibers may be used. Nonwoven synthetic fibers may be spunbonded, meltblown or spunlaced. An example is a spunbonded polypropylene nonwoven known as HYBON™. This is a spunlaid (continuous filament) thermal-bonded polypropylene nonwoven in basis weights of 20, 40, 50, 60, 70, 100, 120, and 150 g/m$^2$, from Texbond s.p.a., Via Formaci 15/17, 38068 Rovereto, Italy. Polyester spunbond nonwovens, with a uniform surface, high tear strength and high porosity, can be used. Polyester spunbond, which is a manufactured sheet of randomly orientated polyester filaments bonded by calendaring, needling, chemically or a combination of these methods in basis weights from 15 to 500 g/m$^2$ is available from Johns Manville Sales GmbH, Max-Fischer-Strasse 11, 86399 Bobingen/Germany.

Woven fibers include cloth, textile, unbacked carpeting and other woven materials made of various natural fibers, synthetic fibers and mixtures thereof may be used as carriers. A needlepunched nonwoven fabric may be used as a carrier. Alternatively, 3024 cellulosic carrier tissue, 18 g/m$^2$, from Cellu Tissue Co., now Cellu Tissue Neenah, 249 N. Lake Street, Neenah, Wis. 54956, may be employed.

Figure 2:
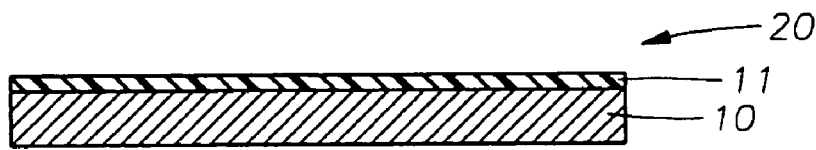

Other embodiments for a nonwoven acoustic insulator structure are provided herein. FIG. 2 shows a cross-sectional view of an alternative embodiment of an acoustic insulating structure 20. The structure 20 is a nonwoven material which comprises the core 10 of FIG. 1 having matrix fibers and binder. Applied to one side of the core or airlaid material 10 is an auxiliary layer 11. The auxiliary layer 11 contains plastic material with a basis weight of from about 50 gsm to about 400 gsm present. The binder layer 11 is preferably on an outer surface of the pad 10 of the nonwoven structure 20, such as surface 2 shown in FIG. 1. However, the binder layer 11 may also be present as a discrete inner layer within the core or base pad 10.

The plastic material forming the binder layer 11 may be one or more of the aforementioned synthetic fibers. Alternatively, the plastic material may be one or more of the aforementioned latex solids. Alternatively still, the plastic material may be one of various other thermoplastic materials such as a hot melt adhesive or a thermosetting material. In one aspect, the auxiliary layer is a moldable thermoplastic or thermosetting polymeric binder material. When the plastic material is derived from latex solids it may contain a filler which was incorporated into the wet latex prior to application to the nonwoven core or pad 10. Suitable fillers include materials with anionic moieties such as, for example, sulfides, oxides, carbides, iodides, borides, carbonates or sulfates, in combination with one or more of vanadium, tantalum, tellurium, thorium, tin, tungsten, zinc, zirconium, aluminum, antimony, arsenic, barium, calcium, cerium, chromium, copper, europium, gallium, indium, iron, lead, magnesium, manganese, molybdenum, neodymium, nickel, niobium, osmium, palladium, platinum, rhodium, silver, sodium, or strontium. Preferred fillers include calcium carbonate, barium sulfate, lead sulfide, lead iodide, thorium boride, lead carbonate, strontium carbonate and mica.

As noted, the auxiliary layer 11 may be made from one or more hot melt adhesives. MOR-MELT™ R-7001E Reactive Hot Melt Adhesive for Textile Lamination from Rohm and Haas Company, 100 Independence Mall West, Philadelphia, Pa. 19106-2399, a moisture curing polyurethane reactive hot melt adhesive, designed for textile laminating, can be used.

Figure 3:
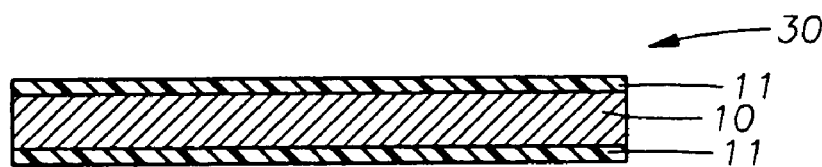

FIG. 3 shows a cross-sectional view for another embodiment of an acoustic insulating structure 30. The structure 30 again includes the core or base pad 10 of FIG. 1. Here, a layer of the plastic material or polymeric binder 11 is applied to both sides of the pad:

The auxiliary layer 11 contains plastic material with a basis weight of from about 50 gsm to about 400 gsm. In other embodiments, the plastic material has a basis weight of from about 75 gsm to about 400 gsm; others, a basis weight of from about 100 gsm to about 400 gsm; others, a basis weight of from about 125 gsm to about 400 gsm; still others, a basis weight of from, about 150 gsm to about 400 gsm. The basis weight of the auxiliary layer 11 can depend upon the nature of the plastic material and the nature and amount of filler used.

Figure 4:
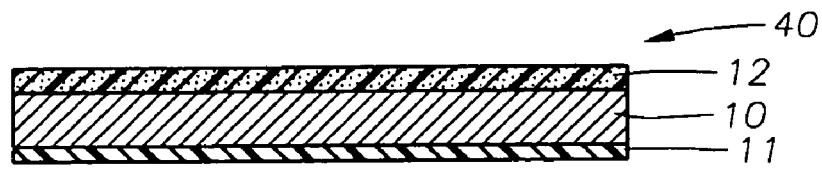

FIG. 4 is a cross-sectional view of the base pad of FIG. 1. In this arrangement, one side of the pad 10 receives a layer of the polymeric binder 11 from FIG. 2, while the other receives a "heavy" layer 12. In order to form the heavy layer, a dense filler is dispersed in a polymeric binder. This allows the heavy layer to act as an additional acoustic barrier. The term "heavy" refers to density. Generally, a heavy layer will have a density greater than 0.1 g/cc.

Binders having dense fine powder filler such as, for example, calcium carbonate, various kinds of clay, such as, for example, bentonite and kaolin, silica, alumina, barium sulfate, talc, titanium dioxide, zeolites, cellulose-type powders, diatomaceous earth, barium carbonate, mica, carbon, calcium oxide, magnesium oxide, aluminum hydroxide, pulp powder, wood powder, polymer particles, chitin and chitin derivatives are suitable for use in the heavy layer 12. Ordinarily, such a heavy layer 12 would only be applied to one side of the material as in FIG. 5. The unfilled binder 11 from FIG. 2 could be used on the other side. The particulate loading of from about 50 to about 700 gsm, based on the weight of binder solids in the latex, is operable in this embodiment. The dense fine powder layer contributes to the acoustic barrier properties of the fibrous layer. The second binder 12, when present, constitutes an amount of up to about 40 percent by weight, based on the total weight of the material, preferably an amount of up to about 15-20 percent.

The heavy layer 12, which is the auxiliary layer 11 containing a dense filler, has a basis weight that may range from about 50 gsm to about 700 gsm. In other embodiments, the heavy layer 12 has a basis weight of from about 75 gsm to about 700 gsm; others, a basis weight of from about 100 gsm to about 700 gsm; others, a basis weight of from about 200 gsm to about 700 gsm; still others, a basis weight of from about 300 gsm to about 700 gsm.

Figure 5:
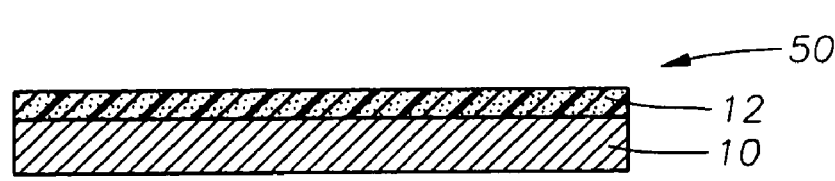

FIG. 5 is a cross-sectional view of the pad of FIG. 4. Here, only the heavy layer 12 is applied to one side of the airlaid pad 10.

In another embodiment involving creating a heavy layer 12 of bonded dense powders and particulates, a powder dosing system is used on an airlaid machine (not shown). The machine lays down a solid layer of powder after the last forming head and before the first compaction roll. Latex binder in an amount sufficient to bond or fix the powder layer to the airlaid, nonwoven material is sprayed or foamed onto the powder-coated material before it passes into the drying/curing stage. This approach to bind powders to airlaid structures was previously used successfully to bind superabsorbent polymer in U.S. Pat. No. 6,403,857, the general teachings of which are incorporated herein by reference.

Alternatively, when the nonwoven material has a synthetic content equal to or greater than about 75 weight percent of the core 10, an auxiliary layer may be formed on a surface of the nonwoven material by partially or totally fusing the surface of the material through the application of heat or radiation.

The basic pad material 10 has improved acoustical features. FIG. 6 is a Cartesian coordinate showing a Normal Incidence Sound Absorption Coefficient. Frequency is charted against absorption coefficient. Two different materials are compared. The first material is a sample of known shoddy. More specifically, the shoddy is a 25 mm thick by 2065 gsm commercially-produced shoddy. Data points are indicated by squares. The second material is Example 33 of a nonwoven material 10, which is a 1,000 gsm airlaid insulator sample that was 26 mm thick. Data points for the nonwoven structure are indicated by circles. The frequency range covered by the experiment was 100-6300 Hertz.

Example 33 represents a prototype of the nonwoven material having fibrous materials formed from bleached Kraft. No latex was sprayed onto any exterior surface of the pad. It can be seen that the absorption coefficient for the nonwoven material was superior to that of the shoddy at frequencies in excess of approximately 750 hertz, even though the nonwoven material 10 is much lighter than the shoddy. (Example 33 is discussed further in connection with Table 8, below.)

The nonwoven material has sound transmission reduction of 5 decibel or greater in an LSTT sound transmission test. More desirably, the nonwoven material has sound transmission reduction of 7 decibel or greater in an LSTT sound transmission test; still more desirably, the nonwoven material 10 has sound transmission reduction of 9 decibel or greater in an LSTT sound transmission test, and preferably, the nonwoven material 10 has sound transmission reduction of 11 decibel or greater in an LSTT sound transmission test.

In a preferred embodiment of this invention, the nonwoven material 10 has a sound absorption coefficient ($\alpha$) as determined by ASTM E1050-98 at 1000 Hz of about 0.5 or greater. Desirably, the nonwoven material 10 has a sound absorption coefficient ($\alpha$) as determined by ASTM E1050-98 at 1000 Hz of about 0.55 or greater, particularly when combined with other layers to form structures 20, 30, 40, or 50. More desirably, the nonwoven material 10 has a sound absorption coefficient ($\alpha$) as determined by ASTM E1050-98 at 1000 Hz of about 0.6 or greater, particularly when combined with other layers to form structures 20, 30, 40, or 50. More desirably still, the nonwoven material 10 has a sound absorption coefficient ($\alpha$) as determined by ASTM E1050-98 at 1000 Hz of about 0.65 or greater, particularly when combined with other layers to form structures 20, 30, 40, or 50. Preferably, the nonwoven material has a sound absorption coefficient ($\alpha$) as determined by ASTM E1050-98 at 1000 Hz of about 0.7 or greater, 0.85 or greater; 0.90 or greater, particularly when combined with other layers to form structures 20, 30, 40, or 50. Even more desirably, the nonwoven material 10 has a sound absorption coefficient ($\alpha$) as determined by ASTM E1050-98 at 2500 Hz of about 0.95 or greater, or about 0.97 or greater, particularly when combined with other layers to form structures 20, 30, 40, or 50.

In a preferred process for the production of the nonwoven material 10 by means of airlaying technology, matrix fibers are selected which are of a length and diameter to have excellent or beneficial thermal and acoustic insulating performance when combined with various fibrous, emulsion or latex, and/or powdered thermoplastic or thermoset binders. Naturally, in the execution of this invention, the physical characteristics of the fibers should be such as to enable them to be efficiently processed through an airlaid machine and be deposited in a primarily random fashion on the continuously moving foraminous belt or wire. In addition to the ability to be processed through a conventional airlaid machine, the selection of the fibers or fibrous mixture is also made in consideration of their resistance to thermal degradation at the elevated temperatures to which they may be subjected during the formation process, the molding operation, and during use.

The fibrous composite will typically have a caliper of from about 1 to about 150 mm or more, and a basis weight of about 200 gsm to 5700 gsm or more, with the core or base pad 10 typically having a basis weight of from about 200 gsm to about 3000 gsm, the carrier when present having a basis weight of from about 10 gsm to about 2000 gsm, and the auxiliary layer 11 when present having a basis weight of from about 50 gsm to about 400 gsm with no filler, or from about 50 gsm to about 700 gsm with filler to form heavy layer 12.

The initial thickness and density of each fibrous layer can be controlled in the airlaid process depending on the desired acoustic response of the panel to be produced. The thickness and weight can be varied to provide a custom acoustical insulating sheet material of the desired structure and possessing the desired properties. A significant advantage of this airlaid approach to acoustic and thermal insulation is the great versatility of the airlaid process to tailor the result to meet specific acoustic or thermal expectations.

The specific type and quantity of binding agents incorporated in each of the fibrous layers can be varied to meet the requirements of the end-use for the acoustic composite. Binder is introduced so as to effect a substantially uniform impregnation of the fibrous matrix and is employed in amounts ranging from as low as about 5 to about 60 percent by weight based on the total weight of the pad 10; more desirably, from about 10 percent to about 45 percent by weight based on the total weight of the core or pad 10. The use of higher concentrations of binder provides for greater rigidity of the resultant contoured panel. For most situations, satisfactory results are obtained when the binding agent is employed in an amount of from about 10 percent to about 60 percent by weight of the core 10. Ordinarily, this range of thermoplastic or thermoset binder is sufficient to render the nonwoven pad moldable. Being able to conform, under heat and pressure, to the unique shape of the body panels of the vehicle being insulated is a necessary requirement. Additionally, various latices, either of natural or synthetic rubber, as well as synthetic resin lattices, such as urethane or the like, can also be satisfactorily employed for this purpose. When latices are employed, they are conventionally spray-applied in liquid form to the fibrous web during the formation of the fibrous layer or blanket on the airlaid machine.

Figure 7:
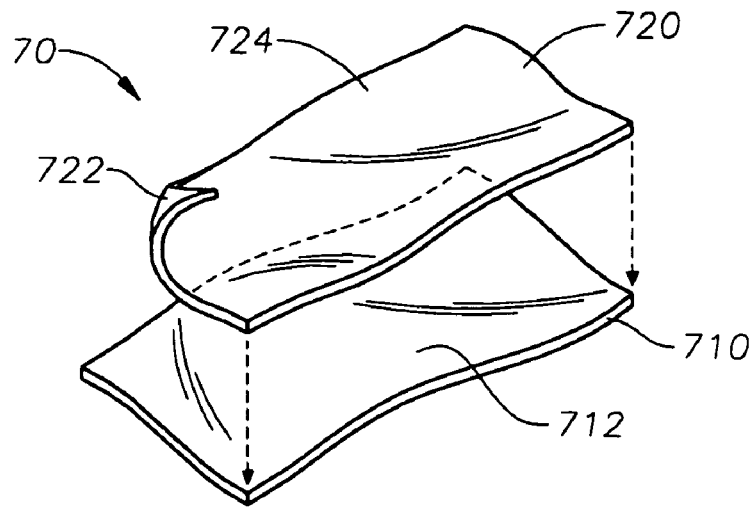
FIG. 7 is perspective view of still another alternate arrangement for an airlaid, nonwoven structure. Here, a scrim and a fibrous base pad are shown. The scrim is exploded away from an interior surface of the base pad for purposes of illustration.

Yet an alternate embodiment of a nonwoven structure is presented at 70 in FIG. 7. In FIG. 7, a nonwoven structure 70 is provided which has nonwoven material or base pad 710. The nonwoven material 710 includes an interior surface 712 and an opposing outer surface (not seen). In addition, the material 710 includes a carrier or "scrim" 720.

The scrim 720 has an interior surface 722. In addition, the scrim 720 has an opposing outer surface 724. The scrim 720 is shown in exploded-away relation to the nonwoven material 710 in FIG. 7. However, this is purely for illustrative purposes. In actual practice, the interior surface of the scrim 720 is integral with the interior surface 712 of the material 710.

As with core 10 of FIG. 1, nonwoven material 710 of FIG. 7 is fabricated of fibrous material held together with a binder. The same cellulosic or synthetic fiber materials used for core or pad 10 may be employed for nonwoven material or pad 710. In the alternate structure 70, the nonwoven material 710 has a basis weight of from about 10 gsm to about 2000 gsm and contains from about 30 weight percent to about 95 weight percent matrix fibers and, from about 5 weight percent to about 70 weight percent of a binder where the weight percentages are based on the total weight of the pad 710. It may be desirable for the pad 710 to alternatively have a basis weight of from about 10 gsm to about 1000 gsm, or more desirably, from about 10 gsm to about 500 gsm, or preferably, from about 10 gsm to about 250 gsm, or alternatively, from about 10 gsm to about 150 gsm.

The scrim 720 may be either woven or nonwoven. In one embodiment, the scrim 720 has a basis weight of from about 8 gsm to about 200 gsm. In another embodiment, the scrim 720 has a basis weight of from about 8 gsm to about 100 gsm; more desirably, from about 8 gsm to about 75 gsm, or it may be preferable that the scrim 720 has a basis weight of from about 8 gsm to about 50 gsm, or even from about 8 gsm to about 25 gsm.

In general the scrim may be formed via the spunbond process, the melt-blown process, the spunlaced process, a carding process or a combination of any of these processes, such as, for example, spunbond-melt-blown-spunbond or spunbond-meltblown-meltblown-spunbond. Of interest also are other useful materials such as those where the scrim is made of a polyester, such as, for example, polyethylene terephthalate, polytrimethylene terephthalate and so forth, a polyolefin, such as, for example, polyethylene, polypropylene and so forth, polylactic acid, nylon or a combination of these materials.

The scrim 720 may be fabricated from natural fibers such as cellulose fibers. Alternatively, synthetic fibers of various sorts which are spun-bonded, meltblown or spunlaced may be used. Still further, various other materials including, cloth, textile, unbacked carpeting and other woven materials made of various natural fibers, synthetic fibers and mixtures thereof may further be used as a scrim 720. Specific materials used for the scrim 720 may include materials listed above for the carrier.

As a result of the manufacturing process, the woven or nonwoven scrim 720 is integral with the interior surface of the pad 710. In one aspect, the scrim 720 is used as a carrier sheet in an airlaid process, with the interior surface 722 of the scrim 720 in direct contact with the interior surface 712 of the nonwoven material 710. In a preferred method of production using airlaying techniques, the nonwoven material or pad 710 is formed directly on the interior surface 722 of the scrim 720. However, the process may combine the scrim 720 with a pre-formed airlaid or other nonwoven material in a converting process.

While the scrim 720 can have a basis weight of from about 8 gsm to about 200 gsm, it may be desirable for the scrim 720 to have a basis weight of from about 8 gsm to about 100 gsm, more desirable, from about 8 gsm to about 75 gsm, or it may be preferable that the scrim 720 has a basis weight of from about 8 gsm to about 50 gsm, or even from about 8 gsm to about 25 gsm.

In addition to the base pad 710 (having matrix fibers and binder) and the scrim 720, the nonwoven structure 70 may further comprise a polymeric coating layer containing polymeric material. The polymeric material has a basis weight of from about 1 gsm to about 40 gsm present on the outer surface 724 of the scrim 720. Alternatively, the polymeric material may be applied to the outer surface (not shown, but opposing the interior surface 712) of the pad 710, or on both. The polymeric coating can be deposited by spraying, foaming, by a roller, or any other convenient method known in the art. Naturally, although the polymeric coating is deposited on an outer surface, there will be some degree of penetration into the scrim 720 or nonwoven pad material 710.

The polymeric material may be one or more of the aforementioned synthetic fibers, latex solids, or various other thermoplastic materials, such as hot melt adhesives, or a thermosetting material other than latex solids. When the polymeric material is derived from latex solids it may contain a filler which was incorporated into the wet latex prior to application to the scrim 720 or pad 710. Suitable fillers include those materials listed above for the auxiliary layer 11 of structure 20 from FIG. 2.

A heavy layer such as layer 12 shown in FIG. 5 may also be applied to a surface of the fibrous pad 710. The heavy layer may be applied through a powder dosing system as described below. The powder dosing system delivers a heavy layer of bonded dense powders and particulates, and is used on an airlaid machine. The airlaid machine lays down a solid layer of powder after the last forming head and before the first compaction roll. Latex binder in an amount sufficient to bond or fix the powder layer to the airlaid is sprayed or foamed onto the powder-coated airlaid before it passes into the drying/curing stage. As noted above, this approach to binding powders to airlaid structures was previously used successfully to bind superabsorbent polymer in U.S. Pat. No. 6,403,857.

Binders having dense fine powder filler include, for example, calcium carbonate, various kinds of clay, such as, for example, bentonite and kaolin, silica, alumina, barium sulfate, talc, titanium dioxide, zeolites, cellulose-type powders, diatomaceous earth, barium carbonate, mica, carbon, calcium oxide, magnesium oxide, aluminum hydroxide, pulp powder, wood powder, polymer particles, chitin and chitin derivatives are suitable for use in the practice of this invention. The particulate loading of from about 0.5 gsm to about 30 gsm, based on the weight of binder solids in the latex, is operable in this embodiment. The dense fine powder layer contributes to the acoustic barrier properties of the fibrous layer 710.

In another embodiment the polymeric coating is made from one or more hot melt adhesives. MOR-MELT™ R-7001E Reactive Hot Melt Adhesive for Textile Lamination from Rohm and Haas Company, Philadelphia, Pa., a moisture curing polyurethane reactive hot melt adhesive, designed for textile laminating, can be used.

In another embodiment involving creating a heavy layer of bonded dense powders and particulates, a powder dosing system is used on the airlaid machine, which lays down a solid layer of powder after the last forming head and before the first compaction roll. Latex binder in an amount sufficient to bond or fix the powder layer to the airlaid is sprayed or foamed onto the powder-coated airlaid before it passes into the drying/curing stage. This approach to bind powders to airlaid structures was previously used successfully to bind superabsorbent polymer in U.S. Pat. No. 6,403,857, the general teachings of which have been incorporated herein.

The polymeric coating on the outer surface of the scrim 720 and the optional second polymeric coating on the outer surface of the pad 710 both have a basis weight of from about 1 gsm to about 40 gsm. They can be the same or different, and, of course, it may be that only a polymeric coating on the outer surface of the scrim 720 is provided. In some embodiments, it may be desirable for a polymeric coating to have a basis weight of from about 1 gsm to about 25 gsm, or from about 1 gsm to about 10 gsm, or even from about 1 gsm to about 5 gsm. In other embodiments, it may be desirable for a polymeric coating to have a basis weight of from about 5 gsm to about 40 gsm, or from about 10 gsm to about 40 gsm, or even from about 25 gsm to about 40 gsm.

Other materials may be deposited on an outer surface of the nonwoven structure 70 or contained in a polymeric coating, such as, for example, a solution of sodium tetraborate decahydrate from U.S. Borax Inc., Valencia, Calif., which is a fire retardant.

For most applications, the side of the nonwoven material 10, 20, 30, 40, 50, 70, facing human occupation will be treated with any of a number of common fire retardant agents known in the art. Most typically, these fire retardant agents include sodium borate or sodium phosphates of various types. Proprietary fire retardant mixtures, such as, for example, Spartan™ AR 295 Flame Retardant from Spartan Flame Retardants Inc. of Crystal Lake Ill., include both organic and inorganic constituents.

Also desired for most insulation applications is resistance to the growth of mold. To achieve this property either the matrix fiber and/or binder or the airlaid insulation material may be treated with any of a number of known mildewcides, such as, for example, 2-iodo-propynol-butyl carbamate, diiodomethyl-p-tolylsulfone, zinc pyrithione, N-octyl chloroisothiazalone, and octadecylaminodimethyltrimethoxysilylipropyl ammonium chloride used with chloropropyltrimethyoxysilane, to name a few. Other biocides that may be used are KATHON® based on isothiazolone chemistry and KORDEK® an aqueous-based microbicide, both from Rohm and Haas.

In some automotive and appliance applications, the acoustic insulation desirably has a degree of water repellency. Door panels, wheel wells, and the engine compartment are typical applications requiring insulation, which will not retain significant amounts of water. Any of the known waterproofing agents like MAGNASOFT® Extra Emulsion by GE Silicones of Friendly, W. Va., for example, are operable.

In accordance with alternative embodiments of the method of making an acoustic insulative structure, the binding agent for the core 10 of the airlaid structure may comprise any one of a variety of thermoplastic heat softening resins which are characterized as being compatible with the fibrous structure 10 and have a heat softening range generally ranging from about 100° C. up to a temperature below that at which thermal degradation of the fibers occurs. Preferably, such thermoplastic resins are of a heat softening range within about 120° C. to about 170° C. Of the variety of thermoplastic resins suitable for use in accordance with the practice of the present invention, polyethylene, polystyrene, polypropylene, acrylic, polyvinyl acetate, polyvinyl chloride resins, or the like, can be satisfactorily used, of which polyethylene itself constitutes a preferred thermoplastic binder. A polyethylene bonding agent in chip form is commercially available from the Dow Chemical Company of Midland, Mich. The chips may be ground to a fine powder for direct addition to the airlaid product.

In a preferred process suitable for commercial production, the nonwoven material (such as structures 10, 20, 30, 40, 50 or 70) used as the insulating material is prepared as a continuous airlaid web. The airlaid web is typically prepared by disintegrating or defiberizing a cellulose pulp sheet or sheets, typically by hammermill, to provide individualized fibers. Rather than a pulp sheet of virgin fiber, the hammermills or other disintegrators can be fed with recycled airlaid edge trimmings and off-specification transitional material produced during grade changes and other airlaid production waste. Being able to thereby recycle production waste contributes to improved economics for the overall process. The individualized fibers from whichever source, virgin or recycle, are then air conveyed to forming heads on the airlaid web-forming machine. A number of manufacturers make airlaid web forming machines suitable for use in this invention, including Dan-Web Forming of Aarhus, Denmark, M&J Fibretech A/S of Horsens, Denmark, Rando Machine Corporation of Macedon, N.Y. (described in U.S. Pat. No. 3,972,092), Margasa Textile Machinery of Cerdanyola del Vallès, Spain, and DOA International of Wels, Austria. While these various forming machines differ in how the fiber is opened and air-conveyed to the forming wire, they all are capable of producing webs useful for forming airlaid, fibrous structures.

The Dan-Web forming heads include rotating or agitated perforated drums, which serve to maintain fiber separation until the fibers are pulled by vacuum onto a foraminous forming conveyor or forming wire. In the M&J machine, the forming head is basically a rotary agitator above a screen. The rotary agitator may comprise a series or cluster of rotating propellers or fan blades. Other fibers, such as a synthetic thermoplastic fiber, are opened, weighed, and mixed in a fiber dosing system such as a textile feeder supplied by Laroche S. A. of Cours-La Ville, France. From the textile feeder, the fibers are air conveyed to the forming heads of the airlaid machine where they are further mixed with the comminuted cellulose pulp fibers from the hammer mills and deposited on the continuously moving forming wire. Where defined layers are desired, separate forming heads are used for each type of fiber.

The airlaid web is transferred from the forming wire to a calender or other densification stage to densify the web, if necessary, to increase its strength and control web thickness. The fibers of the web are then bonded by passage through an oven set to a temperature high enough to fuse the included thermoplastic or other binder materials. Secondary binding from the drying or curing of a latex spray or foam application may occur in the same oven. The oven may preferably be a conventional through-air oven or be operated as a convection oven, but may achieve the necessary heating by infrared or even microwave irradiation. The insulating material may be treated with flame retardants before or after heat curing. In vehicle insulation applications, a flame retardant is typically added to the nonwoven structure 710 in order to comply with the applicable automotive regulations. The finished nonwoven insulating material or structure may be treated with flame retardants and other additives, and rolled, slit, or slabbed and packaged for shipping. However, in vehicle applications the structure 710 may be molded to contour to various vehicle panel surfaces as will be described further below.

In a preferred embodiment of the inventions, the nonwoven structure is an airlaid structure and the nonwoven material is an airfelt or other nonbonded web of fiber or, when bonded, an airlaid web.

Referring again to FIG. 7 and the nonwoven structure 70 having a scrim 720, the nonwoven structure 70 is designed to have a low caliper, or thickness. The caliper generally ranges from about 1 mm to about 60 mm. Preferably, the caliper is from about 1 mm to about 30 mm. In some desirable embodiments, the caliper of the structure 70 is from about 1 mm to about 15 mm, or from about 1 mm to about 7 mm, or from about 1 mm to about 3 mm.

The nonwoven structure 70 has an airflow resistance of from about 500 to about 10,000 Rayls ($NS/m^3$), or desirably in some embodiments, of from about 500 to about 5,000 Rayls ($NS/m^3$), or desirably in some embodiments, of from about 500 to about 3,000 Rayls ($NS/m^3$). By means of the selection of materials used to make the nonwoven structure 70, it is possible to produce materials with a variety of airflow resistances. For example, if greater airflow resistance is desired, a denser scrim 720 with a less open structure may be used, and the polymeric coatings may be of greater basis weight.

Various materials, structures and manufacturing processes useful in the practice of this invention are disclosed in U.S. Pat. Nos. 6,241,713; 6,353,148; 6,353,148; 6,171,441; 6,159,335; 5,695,486; 6,344,109; 5,068,079; 5,269,049; 5,693,162; 5,922,163; 6,007,653; 6,355,079; 6,403,857; 6,479,415; 6,562,742; 6,562,743; 6,559,081; 6,495,734; 6,420,626; in U.S. patent applications with serial numbers and filing dates, Ser. No. 09/719,338 filed Jan. 17, 2001; Ser. No. 09/774,248 filed Jan. 30, 2001; and Ser. No. 09/854,179 filed May 11, 2001, and in U.S. Patent Application Publications or PCT Application Publications US 2002/0074097 A1, US 2002/0066517 A1, US 2002/0090511 A1, US 2003/0208175 A1, US 2004/0116882 A1, US 2004/0020114 A1, US 2004/0121135 A1, US 2005/0004541 A1, and WO 2005/013873 A1, and PCT/US04/43030 claiming the benefit of U.S. provisional patent application Ser. No. 60/569,980, filed May 10, 2004 and U.S. provisional patent application Ser. No. 60/531,706, filed Dec. 19, 2003, and U.S. provisional patent application Ser. No. 60/667,873, filed Apr. 1, 2005, all of which are hereby incorporated by reference in their entirety.

Figure 8:
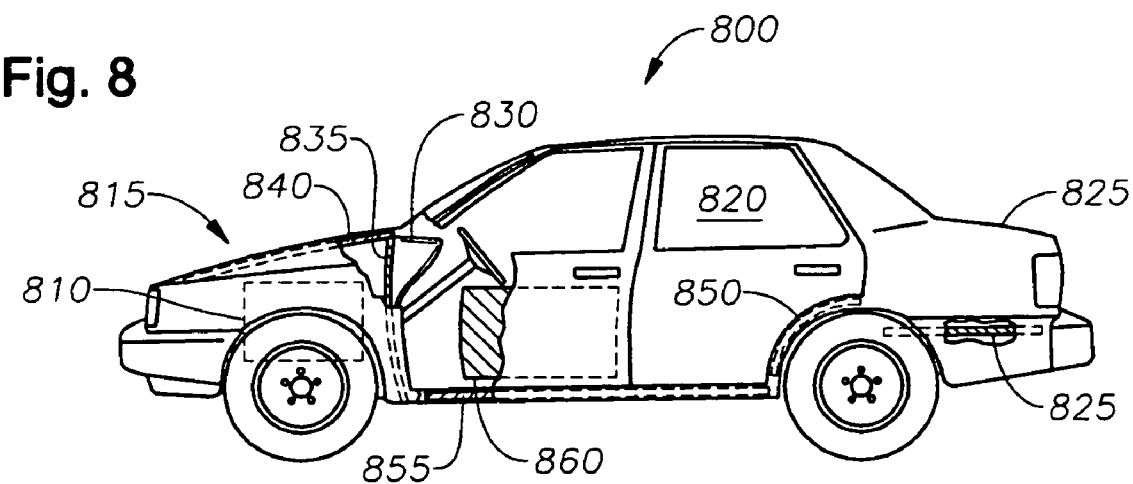
FIG. 8 is a general schematic side view of a vehicle illustrating various exemplary locations for the nonwoven materials of the present invention.

FIG. 8 illustrates a conventional vehicle 800 having an engine (shown schematically at 810) that is disposed within an engine compartment 815 that is typically in a forwardmost section of the vehicle 100. The vehicle 800 has a passenger compartment 820 and a trunk 825 at a rearwardmost section of the vehicle 800. As is typically known, the passenger compartment 820 includes a dashboard, generally indicated at 830, which contains a number of electronic components including electronic control units and display units, as well as electronic entertainment units. The dashboard 830 is the primary component that separates the engine compartment 815 from the passenger compartment 820. As previously discussed, it is desirable to insulate the passenger compartment 820 from undesirable noise which may be transmitted through the frame and the body of the vehicle 800.

The nonwoven structures 10, 20, 30, 40, 50, 60, 70 of the present invention can be placed in any number of locations throughout the vehicle 800 where it is desirable to insulate the passenger compartment 820 from these external or annoying sounds such as engine noise or road noise. Some locations where acoustic and thermal insulation is typically placed includes but are limited to the dashboard 830, where the nonwoven material can be molded into the shape of a dashboard liner; an engine side firewall 835, where the nonwoven material can be molded into the shape of a panel or the like to conform to the shape of the firewall 835; an engine side hood area 840, where the nonwoven material can be molded into a shape of a hood pad or panel; an interior wheel well area 850, where the nonwoven material can be molded into a shape of a panel or the like; a trunk area 825, where the nonwoven material can be molded into a shape of trunk compartment trim insulation; a floor 855 of the passenger compartment 830, where the nonwoven structures 10, 20, 30, 40, 50, 70 can be molded into flooring underlayment; and a vehicle door 860 location, where any of nonwoven structures 10, 20, 30, 40, 50, 70 can be molded into a door panel. It will be appreciated that the above list is merely illustrative and any of nonwoven structures 10, 20, 30, 40, 50, 70 can be placed in any number of other vehicle locations where acoustic and thermal insulation are desired, including a package tray location or even a roof location of the vehicle 800.

One of the advantages of the nonwoven structures 10, 20, 30, 40, 50, 70 is that they may be composed of material which permits the material to be molded into desired shapes and therefore, it is possible to manufacture specially contoured vehicle insulation parts that are already cut and shaped to fit a specific location in the vehicle 800. In other words, when the nonwoven acoustic structure or material is intended to act as a dashboard liner, the material will be molded into the shape of the particular dashboard 830 and therefore, can include various openings, etc. to accommodate other vehicle parts, such as a steering wheel, etc. The ability to pre-mold the nonwoven article represents an improvement over the prior art shoddy materials since the necessary openings and contoured portions of the article can be pre-molded therein, thus eliminating the need for time consuming cutting. Cutting can also lead to unkempt frayed edges about the openings. The nonwoven materials or acoustic structures 10, 20, 30, 40, 50, 70 can be pre-molded for placement in any of the other vehicle locations where insulation is desired. Thus, it will be appreciated that the ability to pre-mold the nonwoven materials permits the insulation articles to be mass produced according to specifications for a particular vehicle. In vehicle insulation applications, a flame retardant is typically added to the nonwoven material in order to comply with the applicable automotive regulations.

It will also be appreciated that the nonwoven material or acoustic structure 10, 20, 30, 40, 50, 70 that is either molded into a particular shape or cut into a particular shape can be coated on at least one face with a thin layer of adhesive or bonding material so as to permit the nonwoven material article to be affixed to another object, such as a metal vehicle part. For example, when the nonwoven material or structure 10, 20, 30, 40, 50, 70 is molded or cut into the shape of a liner for a trunk 825, the material is placed against the metal trunk floor, and it is desirable to locate the nonwoven material or structure 10, 20, 30, 40, 50, 70 so that it does not unnecessarily move. A release layer can initially be applied over the adhesive/bond layer and then be subsequently removed from the adhesive/bond layer at the point of use. For example, the release layer can be a paper release layer, such as waxed paper or the like.

In addition, the nonwoven material or structure 10, 20, 30, 40, 50, 70, in the form of a molded article, can be shaped into an automotive insulating insert or the like that has necessary openings formed therein and also is bonded to a substrate during the manufacturing process (e.g., molding process). For example, the molded nonwoven article can be bonded to a structural support, such as a plastic support, a heavy paper support, or a rug or carpeting. When the nonwoven material or structure 10, 20, 30, 40, 50, 70 is to be used as a trunk liner, it is typically preferred to have some type of rug or carpeting bonded to the acoustic structure to make the trunk area 825 visually more attractive. The rug or carpeting can be bonded to the formed acoustic insulating structure or nonwoven material 10, 20, 30, 40, 50, 70 during the manufacturing (molding) process using conventional techniques, including the use of an adhesive layer therebetween.

In accordance with one aspect of the present invention, the nonwoven material is molded with an application of heat and pressure into a shape which is retained. The panel may have an area that is 50 meters square, or less. Alternatively, the panel may have an area that is 25 meters square, or less; more desirably still, the panel may have an area that is 10 meters square, or less.

In another arrangement, a panel of the nonwoven material having an area of 10 meters square or less, is formed from a continuous process and cut into a long roll suitable for shipping by truck or by rail. Instead of a separate panel, the material can be slit to a desired width and shipped rolled on a core. The roll may contain up to 1000 square meters or more depending on the width and thickness.

Figure 9:
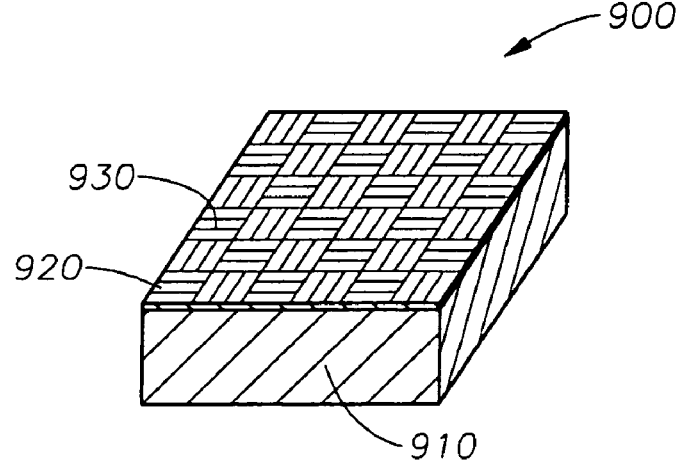
FIG. 9 is a perspective view of a nonwoven structure, formed as a ceiling tile. The tile includes a decorative outer layer.

According to another aspect of the present invention, the nonwoven materials can be pre-molded into articles that are intended to provide acoustic and thermal insulation in a building or the like. As shown in FIG. 9 and according to one exemplary embodiment, the nonwoven material is pre-molded into a ceiling tile 900 that has the desired acoustic and thermal insulation properties. The illustrated ceiling tile 900 is formed of a core 910 of the nonwoven material of the present invention in accordance with pad 10 of FIG. 1. The ceiling tile 900 further has an outer layer 920. It will be understood that the outer layer 920 is not a required element since the ceiling tile 900 can be formed of just the nonwoven materials of the present invention.

The outer layer 920 can be a decorative outer layer that is formed of a material that is different from the nonwoven material that makes up the core or base pad 910. For example, the outer layer 920 can be formed of a synthetic material that provides increased rigidity and stiffness in the outer layer 920. One suitable material for the outer layer 920 is a polymeric material, such as a latex that can be applied to one face of the core 910 to form the outer layer 920. For example, latex can be spray coated onto the one face of the core 910.

The outer layer 920 may include indicia 930, such as a decorative pattern or the like. The decorative pattern can be merely a roughened surface or the decorative pattern can be in the form of a waffle pattern or other grid. The decorative pattern can be formed by any number of different techniques, including embossing or even a molding process where the outer layer 920 is formed of a moldable material that is bonded to the one face of the core 910 by a molding process. The decorative pattern can be formed using a roller or by means of a laminate structure in that the outer layer 920 can be laminated onto the core 910.

Any number of different agents can be added to the tile 900 as previously mentioned, including but not limited to a fire retardant and an agent that inhibits surface growth of mold and mildew, such as BIOBLOCK® paint, or the other aforementioned agents.

As with the other applications for the nonwoven materials of the present invention or as mentioned above, the nonwoven ceiling tile 900 offers superior acoustic and thermal insulation properties compared to conventional insulation that is typically used in buildings and constructed structures. It will be appreciated that the nonwoven materials of the present invention are not limited to being used as ceiling tiles but instead can be used in a number of other building insulation locations, including in side walls and partitions.

All patents, patent applications, and publications cited in this specification are hereby incorporated by reference in their entirety. In case of a conflict in terminology, the present disclosure controls.

While it will be apparent that the invention herein described is well calculated to achieve the benefits and advantages set forth above, it will be appreciated that the invention is susceptible to modification, variation and change without departing from the spirit thereof. For instance, the nonwoven structure is described in the context of an airlaid process. However, non-airlaid processes are also contemplated.

EXPERIMENTAL

Introduction to Sample Pad Formation

A laboratory airlaid apparatus was used which lays down a 35.5×35.5 cm (14×14 inch) pad. This size of sample is often termed a "handsheet" and is suitable for range-finding experiments. A handsheet may be formed before going to an actual airlaid machine to produce a continuous web.

In operating the handsheet former, pre-weighed amounts of selected fibers are added to a mixing chamber where jets of air fluidize and mix the fibers. The mixing chamber thus forms a fluidized "cloud" of fibers. The cloud of fibers is pulled down onto a forming wire by a vacuum source. A tissue or other porous carrier sheet is used over the wire to minimize the loss of fiber to the vacuum system. While some automotive applications call for a spunbond slipsheet or carrier attached to one face of the acoustically insulating handsheet or test pad, in other instances the carrier may be removed before further processing and testing.

A cellulose fluff pulp is typically used for the fiber matrix of the handsheet. The cellulosic material was chosen from any of the following:

1. FOLEY FLUFFS® bleached Southern softwood Kraft from Buckeye Technologies, Inc. of Memphis, Tenn.;
2. Unbleached Kraft wrapping paper, 42 pound stock, from Southern States Packaging, Spartanburg, S.C.;
3. Recycled unbleached Kraft from grinding post-consumer use cardboard;
4. Recycled pulp from grinding waste newsprint;
5. Recycled airlaid fibers from disintegrating various latex-bonded and fusible-fiber-bonded airlaid webs from Buckeye Technologies, Inc.; and
6. TEMFITE-P® (75 percent Northern hardwood 25 percent Northern softwood) sulfite pulp from Tembec of Temiscaming, Quebec, Canada.

The chosen fibers are preferably mechanically defibrated (comminuted) into a low density, individualized, fibrous form known as "fluff" prior to feeding to the handsheet apparatus. Mechanical defibration may be performed by a variety of methods which are presently known in the art. Typically a hammer mill, such as, for example, a Kamas Mill, is employed. A Kamas Mill from Kamas Industri AB, Sweden with a 51 mm (2 inch) slot is particularly useful for laboratory scale production of fluff Another type of device, which has been found to be particularly useful for defibrating the cellulosic fibers in the laboratory is the three stage fluffing device described in U.S. Pat. No. 3,987,968, which is hereby incorporated by reference in its entirety. The three stage fluffing device subjects cellulosic pulp fibers to a combination of mechanical impact, mechanical agitation, and air agitation to create a substantially knot-free fluff pulp. Unless otherwise stated, in the following working examples, the FOLEY FLUFFS® dry lap pulp sheet was defibrated or comminuted using the Kamas mill while the unbleached kraft, cardboard, newsprint, virgin hardwood, and recycled airlaid fibers were comminuted using the three-stage fluffer.

The acoustic test pads may be fabricated from all-synthetic materials rather than cellulosic materials. Various polyethylene binder fibers may be used. For the preparation of acoustic materials or pads made from all-synthetic fibers in which PET is the matrix fiber instead of cellulose fluff, the following fiber raw materials were used:

1. PET, Recycled staple fiber, 15 dpf×6 mm type 376×5 by Wellman, Inc. of Johnsville, S.C.;
2. PET, virgin staple fiber 6 dpf×6 mm merge 35379A and 15 dpf×6 mm merge 35391A by Invista, formerly KoSa, of Salisbury, N.C.; and
3. co-PET bico, 2 dpf×6 mm, which has a lower melting copolyester sheath around a polyester core. Examples of this kind of copolyester are M1440, M1426 or M1427 by Wellman International, Mullagh, Kells, Co., Meath, Republic of Ireland and T254 by Invista, Salisbury, N.C.

A binder fiber will also be used in the preparation of the handsheets. Where the handsheets employ a cellulose fluff matrix, the binder fiber is preferably Type 255, Lot 1661 polyethylene sheath polyethylene terephthalate. The fiber is also referred to as PET or polyester, core 2 dpf (denier per fiber) by 6 mm cut length bicomponent fiber from Trevira of Bobingen, Germany. Bicomponent fibers are commonly referred to as "bico".

The binder fibers and other synthetic fibers come loosely baled and do not require a separate opening step when used in the laboratory pad-former. It is understood that actual airlaid production facilities have bale-opening equipment and means to meter the synthetic staple fiber.

The laboratory scale airlaid handsheet apparatus, which can be operated step-wise to simulate the commercial multiple forming head airlaid process, was used to air lay the fiber mixtures into 35.56 cm (14 inch) square airfelt pads. The handsheet former is located in a temperature and relative humidity controlled room maintained at 73.4±2.7° F. and 50±5% relative humidity. The fibrous raw materials are equilibrated in the controlled humidity room for at least 30 minutes prior to forming the pad. The controlled humidity and temperature are necessary to avoid static electricity problems in the air handling of finely divided materials. For these high basis weight materials, the handsheet apparatus is used to build a pad in up to 24 stages or layers. Forming the pad in this many steps helps ensure that the batch-type forming head of the laboratory airlaid handsheet apparatus better simulates the degree of homogeneity which is obtained in a multiple forming head continuous airlaid manufacturing machine.

After each portion of the total weight of fibers is laid down, the sample is turned 90 degrees in the apparatus. This procedure helps to minimize air turbulence artifacts and delivers a more uniform pad. In this step-wise fashion the entire airlaid test pad is formed. The pad is pressed to a target thickness in a laboratory press heated to 150° C. and held there from 5-30 minutes to fully activate the thermoplastic sheath of the bicomponent binder fiber.

For the purpose of initially screening large numbers of variations of insulating pad designs, a small sound transmission chamber was constructed. Laboratory Sound Transmission Tests (or LSTT) were performed in the chamber. The LSTT chambers were divided in half, forming a sound source or sound-generating portion and a sound receiving portion. Each half or portion of the test chamber was 25.4 cm (ten inches) square in cross-section and 61 cm (24 inches) in length. The chamber halves were constructed of 19 mm (¾ inch) medium density particle board and lined with mineral fiber acoustic ceiling tile, Style 755B Fissured Square Lay-in by Armstrong World Industries of Lancaster, Pa., to minimize reverberation within the chamber halves. The tile lining reduced the interior size of the sound chambers to 22.2 cm (8.75 inches) square. Soft rubber feet were placed on the bottom of each section to isolate the chamber from the bench-top.

A microphone was placed within the sound receiving portion of the test chamber to detect and measure sound. A microphone probe of a decibel gauge, Extech Model 407736 sound level meter, was inserted through a close-fitting hole in the end of the sound-receiving chamber. A 10 cm (4 inch) diameter speaker, Pioneer, Mod TS-G1040R with 10 cm woofer and 2.7 cm tweeter, frequency response. of 45-22000 Hz and 4.0 Ohms impedance, was installed at the end of the sound source portion of the chamber. The speaker was isolated by suspending it on rubber bands stretched between bolts protruding through the end cap. To generate a standard sound, a compact disc "Pure White Noise—The Voice of Earth" available from www.PureWhiteNoise.com was played through an RCA portable CD player, Model RCD025. The CD player was amplified through a 30 watt Lafayette Model LA-224T amplifier until the sound level on the other side of a 0.35 mm (0.014 inch) thick aluminum sheet is 90 decibels. The aluminum sheet is placed on the sound-generating side of the chamber.

After the LSTT chamber is set up, the pad samples to be tested are clamped between the sound source and sound-receiving chamber portions against the aluminum sheeting which is on the source chamber side. Only about 10-15 mm of the edges of the samples are compressed by being mounted between the two halves of the test apparatus. Without changing the volume setting on the CD player/amplifier and from what delivered the 90 dB sound through the aluminum sheet, the sound level is monitored for approximately one minute. The high and low decibel readings are recorded and the results averaged to represent the acoustic performance.

In order to directly compare samples of differing basis weights, a Sound Absorption Mass Index (SAMI) is calculated. SAMI is defined as the sound transmission loss in the LSTT (difference in decibel reading between transmitted sound without the sample in place and the reading with the sample installed) divided by the basis weight of the sample expressed in kilograms per square meter. Basically, this index normalizes the acoustic data from the LSTT for basis weight. Basis weight directly correlates to cost of manufacture of each insulation part. A very thick and dense material may absorb sound extremely well, yet be too costly to be commercially viable.

Table 1 is presented to demonstrate the sound transmission loss and other features of various airlaid, nonwoven materials in comparison to shoddy. Five comparative examples are provided. The control shoddy was obtained from the carpet underlayment of a Ford Motor Company FREESTAR® minivan, and is designated "CS-1."

In each of Examples 1-5, the weight ratio of cellulose pulp to bicomponent fiber was 80/20. Each example is a laminate of two airlaid slabs, which are coated on the outer sides with 120 gsm of the carboxylated SBAN latex binder from Dow-Reichhold. Abbreviations represent various fiber forms as follows:

"BK" means bleached Southern softwood Kraft.
"UBK" is unbleached Kraft.
"CB" represents comminuted cardboard, which is a recycled material made of unbleached kraft paper and retaining the construction adhesives used in making the original corrugated board. Strips of cardboard 25 mm by 100 mm were fed to the three-stage fluffer to create the loose fluff.
"HW" is a virgin pulp mixture from Tembec containing 25 percent Northern softwood and 75 percent Northern hardwoods, which was sent through the three-stage fluffer prior to being weighed out for the laboratory pad-forming apparatus. The pads were not compacted to any target thickness, but were cured in the oven at whatever thickness they were coming out of the pad-former.

TABLE 1

Examples 1-5—Laboratory Sound Transmission Test

| Sample | Example | Density (g/cc) | Caliper (mm) | Basis Weight (gsm) | LSTT (dB) | LSTT ($\delta$dB) | SAMI ($\delta$dB/kgsm) |
|---|---|---|---|---|---|---|---|
| BK | 1 | 0.016 | 68 | 1412 | 78 | 12 | 8.50 |
| UBK | 2 | 0.018 | 56 | 1411 | 80 | 10 | 7.09 |
| CB | 3 | 0.021 | 52 | 1355 | 80 | 10 | 7.38 |
| HW | 4 | 0.028 | 37 | 1449 | 83 | 7 | 4.83 |
| CB | 5 | 0.035 | 29 | 1175 | 83 | 7 | 5.95 |
| CS-1 | shoddy | 0.12 | 26 | 2065 | 84 | 6 | 2.91 |

The raw decibel readings, sound transmission loss ($\delta$dB), and the calculated SAMI values in Table 1 suggest that density or caliper may play important roles in sound absorption. In this respect, lower density (or higher caliper) samples were more sound-absorbent. Since sound transmission is being measured, the fact that lower density materials apparently work well indicates that the actual mechanism of sound deadening in this case is probably absorption rather than blocking. Without being bound by any theory, the inventors believe that the demonstrated efficiency of sound reduction is through the process of absorption by the airlaid composites and is in large part due to the vast number of small, short fibers, which are present in a given volume of composite. Although larger synthetic fibers still function to absorb sound energy, having a plethora of low modulus fine cellulose fibers and small pores between fibers most effectively absorbs the incident sound energy and dissipates it by mechanical vibration ultimately resulting in the generation of heat.

The nonwoven or structures 10, 20, 30, 40, 50, 70 of this invention desirably have a SAMI of about 3 $\delta$dB/kgsm or greater. Even more desirably, the structures will have a SAMI of about 5 $\delta$dB/kgsm or greater; still more desirably, a SAMI of about 6 $\delta$dB/kgsm or greater; more preferably, a SAMI of about 7 $\delta$dB/kgsm or greater, and more preferably, a SAMI of about 8 $\delta$dB/kgsm or greater. In other words, greater sound transmission loss is preferred.

To expand upon the above findings, another experiment was carried out in which the caliper of the samples was held constant at 25 mm and the basis weight and resulting density were varied. The additional test samples are listed in Table 2, below. In Table 2, Examples 6-11 are listed. Examples 6-8 were formed in one layer in the pad-former but Examples 9-11 were laminated from two separate pieces of airlaid. These airlaid samples were only thermally bound and not sprayed with latex binder.

Since from Table 1 the source of the cellulose fluff matrix fiber did not seem to be a major factor, the raw material selection used in the experiment listed in Table 2 was limited to FOLEY FLUFFS® and the binder fiber was Type 255 Lot 1661 bicomponent fiber from Trevira. The samples were cured in a heated press between aluminum plates shimmed out to 25 mm until their internal temperatures reached at least about 140° C. to melt the polyethylene sheath of the binder fiber.

TABLE 2

Examples 6-11—Effect of Basis Weight at Constant 25 mm Thickness

| Example | Density (g/cc) | Basis Weight (gsm) | LSTT (dB) | LSTT ($\delta$dB) | SAMI ($\delta$dB/kgsm) |
|---|---|---|---|---|---|
| 6 | 0.020 | 506 | 85.0 | 5 | 9.88 |
| 7 | 0.029 | 735 | 84.8 | 5.2 | 7.07 |
| 8 | 0.038 | 973 | 84.8 | 5.2 | 5.34 |
| 9 | 0.050 | 1243 | 85.3 | 4.7 | 3.78 |
| 10 | 0.062 | 1539 | 85.2 | 4.8 | 3.12 |
| 11 | 0.078 | 1939 | 85.2 | 4.8 | 2.48 |

Table 2 shows clearly that density, or basis weight at constant thickness, is not a primary factor in absolute sound absorption in decibels when caliper is held constant. While density varied from 0.020 g/cc to a high of 0.078 g/cc, sound transmission was essentially the same. The constant factor in this experiment was caliper or thickness. The SAMI calculation emphasizes that basis weight is a strong factor in cost/effectiveness or sound absorption per unit mass. What this table of data also suggests is that thickness of the absorbing media may be more important than other physical properties of the media. Accordingly and within reasonable practical limits, airlaid sound and thermal insulation is projected to perform about as well at lower weight but equal thickness as more conventional material currently employed for these purposes. Airlaid insulation materials exhibit outstanding performance when basis weight is taken into account.

To further explore the effects of thickness on sound absorbency, pad sample Examples 12-14 were formed. Table 3 demonstrates tests on Examples 12-14. In these Examples, the density of the fiber matrix was held constant at 0.04 g/cc and the basis weights (and calipers) were varied. It is noted that Example 8 from Table 2 is brought into Table 3 as Example 13. This experiment did not apply any second (latex) binder to the airlaid pads. Holding the density the same and allowing the basis weight and thickness to vary shows a small but definite direct effect of thickness on absolute sound absorbency, but the SAMI calculation shows that lower basis weight is more effective, since it shows a greater decibel change per unit mass.

TABLE 3

Examples 12-14—Constant Density of 0.04 g/cc

| Example | Caliper (mm) | Basis Weight (gsm) | LSST (dB) | LSST (δdB) | SAMI (δdB/kgsm) |
|---|---|---|---|---|---|
| 12 | 19 | 751 | 85.5 | 4.5 | 5.99 |
| 13 | 25 | 973 | 84.8 | 5.2 | 5.34 |
| 14 | 34 | 1333 | 83.4 | 6.6 | 4.88 |

Next, pad sample Examples 15-19 were formed. The effects of the addition of a polymeric binder layer, indicated by "L" for Latex or "NL" for no latex, on one or both sides of the airlaid sample and of different levels of bicomponent binder fiber on sound transmission were explored. These variations are presented in Table 4. The latex binder (indicated by "L") was the styrene-butadiene-acrylonitrile emulsion product 68957-80 from Dow-Reichhold Specialty Latex.

TABLE 4

Examples 15-19—
Effect of Additional Binder at Constant 25 mm Thickness

| Example | Type | Density (g/cc) | Basis Weight (gsm) | LSST (dB) | LSST (δdB) | SAMI (δdB/kgs m)? |
|---|---|---|---|---|---|---|
| 15 | NL 20% bico | 0.039 | 973 | 84.8 | 5.2 | 5.34 |
| 16 | NL 40% bico | 0.040 | 1014 | 85.4 | 4.6 | 4.54 |
| 17 | L 159 gsm 1 Side | 0.045 | 1132 | 84.2 | 5.8 | 5.12 |
| 18 | L 136 gsm 2 Sides | 0.050 | 1244 | 83.8 | 6.2 | 4.98 |
| 19 | L 231 gsm 1 Side | 0.048 | 1204 | 83.2 | 6.8 | 5.65 |

It can be seen that there is not a statistically significant difference in sound transmission between Example 15, with 20 percent bicomponent fiber, and Example 16, with 40 percent bicomponent fiber. However, adding a discrete layer of latex binder to one or both sides of the sound absorber seems to have a slight effect on reducing sound transmission (increasing sound transmission loss); however, the effect again is not statistically significant. More importantly, the polymeric binder clearly does not lower the acoustic performance. For purposes of moldability in various applications, it may be desirable to have the sound absorbing airlaid coated with latex binder.

Next, the laboratory handsheet forming apparatus was used to prepare a series of all-synthetic airlaid insulation pads of various basis weights (BW). These pad samples are listed in Table 5 as Examples 20-26. The test pads were formed from a 70/30 blend of polyester fibers and copolyester sheath bicomponent binder fibers. In Table 5, R-PET is recycled polyester and V-PET is virgin polyester. Pads with basis weights up through 800 gsm were formed in 12 stages with the web rotated 90° between each addition of fiber. Pads at 1000 gsm basis weight were similarly formed but in 24 stages. The unconsolidated webs were heat set in a 150° C. convection oven for 15-30 minutes and then trimmed to 30.5 cm (12 inch squares). Compaction to final thickness was done with a force of 408 kg (900 lbs.) in a press heated to 150° C. using aluminum and brass shims to set the final thickness. Pads of 1000 gsm were held in the press for 30 minutes while lower basis weight pads were heated for 15 minutes.

TABLE 5

Examples 20-26—All-Synthetic Airlaid Insulation Panels

| Example | BW (gsm) | Matrix Fiber | Density (g/cc) | Caliper (mm) | LSTT (dB) | LSTT (δdB) | SAMI (δdB/kgsm) |
|---|---|---|---|---|---|---|---|
| 20 | 400 | R-PET 15 dpf | 0.015 | 28 | 87 | 3 | 7.5 |
| 21 | 600 | R-PETe 15 dpf | 0.017 | 36 | 86 | 4 | 6.67 |
| 22 | 600 | V-PET 6 dpf | 0.020 | 31 | 86 | 4 | 6.67 |
| 23 | 600 | V-PET 15 dpf | 0.018 | 35 | 86 | 4 | 6.67 |
| 24 | 750 | V-PET 6 dpf | 0.018 | 46 | 85 | 5 | 6.67 |
| 25 | 800 | R-PET 15 dpf | 0.017 | 47 | 85 | 5 | 6.25 |
| 26 | 1000 | V-PET 6 dpf | 0.018 | 59 | 83 | 7 | 7.00 |
| CS-1 | 2065 | Shoddy | 0.12 | 26 | 84 | 6 | 2.91 |
| 13 | 973 | fluff/bico | 0.038 | 25 | 84.8 | 5.2 | 5.34 |

Table 5 shows that, while the low basis weight/high caliper all-synthetic airlaid panels do not absorb sound very efficiently on an absolute basis, when the basis weight is factored in, the performance in dB drop per unit mass is very good. In addition to significant weight-savings over shoddy, there are other properties where the all-synthetic insulation would also outperform the cellulose-based insulation, such as moisture resistance and inherent mildew resistance.

Next, Table 6 presents tests performed on pad sample Examples 27 and 27A. Examples 27 and 27A illustrate the use of an airlaid panel or pad of this invention as an acoustic ceiling tile or acoustic wall covering. For these working examples, a 30/70 bico/fluff airlaid produced on a 2.7 meter wide commercial airlaid machine is compared to two types of commercial acoustic ceiling tiles. The mineral fiber tile (CS-2) is Fissured Square Lay-In type 755B from Armstrong World Industries of Lancaster, Pa. The vinyl faced fiberglass tile (CS-3) type 3020A is also by Armstrong. For the LSTT, Laboratory Sound Transmission Tester, the tiles are mounted with the decorative face of the tiles facing the 90 dB sound source. The spunbond carrier side of the airlaid panel or test pad faced the sound source. Rather than measuring how the ceiling tile absorbs sound within a room, the LSTT measures how much sound generated in the room escapes from the room.

The airlaid sample 27A is the same material as Example 27 except that it was finished at a higher caliper. Random Incidence Sound Absorption was measured on the airlaid material and on the mineral fiber commercial ceiling tile according to ASTM C423-02a, Sound Absorption and Sound Coefficients by the Reverberation Room Method. The samples were mounted, according to ASTM E795-00, on a type E400 fixture. The Noise Reduction Coefficient, NRC, is the average of the Random Incident Sound Absorption Coefficients at 250, 500, 1000, and 2000 Hz. rounded to the nearest 0.05. The microphone was mounted on the same side of the acoustic panels as the sound source. This ASTM test measures how well the absorbent material reduces the sound level within a room. A coefficient of 1.0 would mean that all the incident sound was absorbed.

TABLE 6

Examples 27-27A—Ceiling Tile Sound Transmission

| Example | Construction | BW (gsm) | Caliper (mm) | Density (g/cc) | LSTT (dB) | SAMI (δdB/kgsm) | NRC |
|---|---|---|---|---|---|---|---|
| 27 | airlaid | 797 | 21.6 | 0.037 | 85.7 | 5.40 | |
| 27A | airlaid | 800 | 31 | 0.026 | | | 0.75 |
| CS-2 | mineral fiber | 3097 | 14 | 0.22 | 79.8 | 3.29 | 0.5 |
| CS-3 | vinyl/fiberglass | 1136 | 25 | 0.045 | 84.7 | 4.67 | |

According to the results in Table 6, while the airlaid nonwoven panel at 797 gsm and 21.6 mm caliper (Example 27) is close to the resin-bonded fiberglass ceiling tile (CS-3) in reducing the volume of white noise passing through it. However, it is not as effective in absolute sound absorption as the heavy mineral fiber commercial ceiling tile (CS-2, which is 3.9 times the basis weight of the airlaid Examples 27. However, when the changes in decibel readings (8 dB) are normalized to basis weight, shown on Table 6 as SAMI, the airlaid sample Example 27 is more efficient than both commercial tiles in the LSTT.

In the ASTM C423-02a test, the thicker lower density version of the airlaid test pad is significantly more sound absorbent on an absolute basis than the commercial ceiling tile, which is thin and dense. The airlaid panel or test pad absorbed 75% of the incident sound in the room while the commercial tile only absorbed 50%.

Examples 28-30 shown in Table 7 demonstrate test samples fabricated with a machine having forming heads. The pads were made on a 0.6 meter wide pilot scale airlaid machine operating with three Dan-Web style forming heads. The web was formed on a 17 gsm polypropylene spunbond carrier type P9 obtained from BBA Fiberweb of Nashville, Tenn. The compaction roll after the forming heads was raised so that it did not touch the web during this trial. The binder sprayed on Example 30 was the carboxylated SBAN latex binder from Dow-Reichhold, which was diluted to about 10 percent solids. For this trial, the line was stopped to allow the web a residence time of about 20 minutes in the oven, which had been converted from through-air to convection. In actual production, the line would not be stopped and the web would pass through several ovens. In Table 7 under the heading "Type," the numbers refer to the bico/cellulose fluff ratio.

TABLE 7

Examples 28-30—Pilot Scale Airlaid Machine Samples

| Example | Type | Latex Binder | Density g/cc | Caliper mm | Basis Weight (gsm) | LSTT (dB) | SAMI (δdB/kgsm) |
|---|---|---|---|---|---|---|---|
| CS-1 | Shoddy | NA | 0.12 | 26 | 2065 | 84 | 2.9 |
| 28 | 30/70 | NA | 0.023 | 32 | 750 | 83.9 | 8.1 |
| 29 | 30/70 | NA | 0.026 | 39 | 1000 | 83.3 | 6.7 |
| 30 | 20/80 | 120 gsm | 0.028 | 35 | 960 | 83.7 | 6.6 |

Table 7 shows that the airlaid insulation material of Examples 28-30, which were produced on a pilot-scale airlaid machine, have sound absorption equivalent to the commercial shoddy material of considerably greater basis eight but lower caliper (higher density). Expressed per unit mass, the airlaid outperforms the shoddy.

To confirm and build upon the above findings, samples of various airlaid materials were submitted for testing to a certified acoustics test laboratory, Kolano & Saha Engineers, Inc. of Waterford, Mich. The Impedance Tube Sound Absorption Test procedure in accordance with the standard test method of ASTM E1050-98 "Impedance and Absorption of Acoustical Materials using a Tube, Two Microphones, and a Digital Frequency Analysis System" was used. The measurement was made using a two-microphone impedance measurement tube, B & K type 4206 from Brüel and Kjaer of Naerum, Denmark.

As noted, a main difference between the standard acoustic tests and the screening test is that with the Impedance Tube Sound Absorption Test, the microphone(s) is/are on the same side of the sample as the sound source, whereas with the LSTT the sample is between the microphone and the sound source. The Impedance Tube Sound Absorption Test also records details on frequency-related acoustic properties while the LSTT only measures the loudness of the white noise.

Concerning the Impedance Tube Sound Absorption test, plane waves were generated in the tube by a random noise source. The standing waves were measured at two fixed locations using wall mounted microphones. The signals from the microphones were sent to a dual channel signal analyzer (B & K) Type 2032 to determine the complex acoustic transfer function, and finally to compute the sound absorption coefficient using a software package (B & K Type BZ5050). The sound absorption coefficient is the ratio of the amount of sound energy absorbed to the amount of sound energy incident upon the sample. Total absorption of the incident sound energy would have a coefficient of 1.0.

The samples were tested with no air space between the material and the sample holder back plate. The samples were die-cut to fit the large (100 mm diameter) and small (29 mm diameter) sample holders of the B & K type 4206 tube. The large tube has a measurement range of 100-1600 Hz while the small tube operates from 1000-6300 Hz. The comparative showing (CS-2) was the same shoddy material used in Table 1. As noted in the first column, the examples in Table 8 were not sprayed with latex (NL), had 120 gsm of latex sprayed on one side (L-1), latex on each side (L-2), or had 240 gsm carbonate filler in the latex applied to each side (CCL-1). UB Kraft is unbleached Kraft pulp. B Kraft is bleached Kraft. Absorption Coefficients ($\alpha$) were computed and the results were averaged. Noise Reduction Coefficient, of "NRC," is the average sound absorption coefficients for the frequencies 250, 500, 1000, and 2000 Hz. NRC is used in the automotive industry to compare overall performance and allows samples which absorb well at low frequencies to be compared to samples absorbing well at higher frequencies. The full range of sound frequencies tested is illustrated in FIG. 1 for the control shoddy and Example 33.

TABLE 8

Examples 31-38 Sound Absorption Test

| Sample | Example | Density (g/cc) | Caliper (mm) | Basis Weight (Gsm) | α 1000 Hz. | α 2500 Hz. | NRC |
|---|---|---|---|---|---|---|---|
| UB Kraft | 31 | 0.028 | 31 | 706 | 0.456 | 0.832 | 0.376 |
| B Kraft w/o Latex | 32 | 0.03 | 25 | 750 | 0.412 | 0.879 | 0.357 |
| B Kraft w/o Latex | 33 | 0.037 | 26 | 1000 | 0.473 | 0.931 | 0.388 |
| B Kraft latex 1 side | 34 | 0.04 | 32 | 1200 | 0.721 | 0.991 | 0.535 |
| B Kraft | 35 | 0.031 | 34 | 1287 | 0.674 | 0.991 | 0.516 |
| B Kraft w/o Latex | 36 | 0.04 | 36 | 1300 | 0.696 | 0.986 | 0.541 |
| B Kraft w/o Latex | 37 | 0.05 | 25 | 1300 | 0.572 | 0.957 | 0.444 |
| B Kraft CaCO$_3$ | 38 | 0.073 | 28 | 1680 | 0.452 | 0.925 | 0.392 |
| Shoddy | CS-1 | 0.12 | 26 | 2065 | 0.511 | 0.817 | 0.415 |

The Sound Absorption Coefficient measurements in Table 8 generally support the initial conclusions from the sound transmission screening measurements of Table 1. Caliper appears to be a stronger factor in sound absorption than density and basis weight, however if composition and caliper are held constant as in Examples 32, 33, and 37, there is a definite trend toward higher sound absorption at higher basis weight over the range of 750 to 1300 gsm. Airlaid pads are quite effective at absorbing sound at significantly lower density and basis weight than the control shoddy material in common usage. The samples most effective at absorbing sound were Examples 34-36. These airlaid samples were all 80/20 bleached cellulose fluff/bicomponent binder fiber, greater than 25 mm in thickness and 1200-1300 gsm basis weight. Light weight Examples 31-32 and heavy weight Example 38 outperformed the shoddy at 2500 Hz, but not at the lower frequency 1000 Hz. The strong impact of the latex coating alone on low frequency sound absorption is shown in going from Example 33 to Example 34. Table 8 illustrates that acoustic performance equal or better than the current shoddy materials can be obtained with airlaid materials at a considerable weight savings, which could translate into improved vehicle gas mileage.

Tables 9 and 10 compare the wood pulp/bicomponent fiber airlaid nonwoven test pads (Examples 39-41) with carded and needlepunched nonwovens prepared from polypropylene thermoplastic fibers and natural fibers other than wood pulp. The comparison information (Samples A-F) was found in the published conference papers of INDA (Association of the Nonwoven Fabrics Industry) for INJ (International Nonwovens Journal) Summer 2000, pp. 35-36, entitled "Performance of Nonwoven Cellulosic Composites For Automotive Interiors". Table 9 shows the physical properties of the samples and Table 10 compares the ASTM C-384 sound absorption coefficients expressed as percents where total sound absorbency at a given frequency would be 100 percent. Samples 39-41 are Working Examples 39-41 and were prepared on the laboratory scale pad-former and submitted for the Impedance Tube Sound Absorption Test ASTM E-1050-98. The same frequencies as used in the published article cited above were selected in order to have side-by-side comparison of different fibers. The test methods differ mainly in that C-384 uses a single movable microphone and E-1050-98 uses two microphones. For most purposes, the data may be used interchangeably.

TABLE 9

Cellulosic-based Nonwovens

| Sample | Material | Blend Ratio | Thickness (mm) | Weight (gsm) | Density (g/cc) |
|---|---|---|---|---|---|
| A | Flax/PP | 50:50 | 12 | 698 | 0.0580. |
| B | Jute/PP | 50:50 | 12 | 686 | 0.057 |
| C | Kenaff/PP | 50:50 | 12 | 670 | 0.056 |
| D | Cotton/PET/PP | 35:35:30 | 11 | 770 | 0.07 |
| 39 | Pulp/Bico | 80:20 | 13 | 500 | 0.038 |
| 40 | Pulp/Bico/Latex | 66:17:17 | 31 | 706 | 0.023 |
| 41 | Pulp/Bico/Latex | 66:17:17 | 25 | 750 | 0.03 |

That the wood pulp bico fiber airlaid pads of the present invention are substantially lower in density than the prior art materials prepared from other natural and synthetic fibers are very evident in Table 9.

TABLE 10

Absorption References for Noise Reduction by ASTM C-384 and E 1050-98

| Freq. (Hz) | Target (%) | A % | B % | C % | D % | 39% | 40% | 41% |
|---|---|---|---|---|---|---|---|---|
| 800 | 9 | 15 | 15 | 17 | 18 | 14 | 43 | 33 |
| 1000 | 16 | 20 | 20 | 20 | 25 | 18 | 46 | 41 |
| 1600 | 35 | 32 | 35 | 34 | 36 | 33 | 69 | 65 |
| 2000 | 51 | 53 | 66 | 63 | 52 | 54 | 71 | 77 |

Table 10 shows that the airlaid nonwoven test samples essentially meet or exceed the industry targets and the thicker samples 40 and 41, which also have a latex binder applied, outperform all the needlepunched fiber combinations. The airlaid process is ideal for yielding thick yet lightweight nonwovens. Thickness has been shown (Tables 1 and 3) to be directly proportional to sound absorption efficiency indicated by a lower LSST reading for thicker samples.

Example 42

Deep Draw Moldability

An airlaid product was placed into a mold to demonstrate moldability of a nonwoven material. A circular aluminum mold was machined. The 152.4 mm (6.0 in) circular aluminum mold top has a 69.85 mm (2.75 in) circular projection tapering over (0.875 in) to a diameter of 50.8 mm (2.0 in). The aluminum mold base is machined out to a depth of 25.4 mm (1.0 in) and has an initial diameter of 76.2 mm (3.0 in) tapering to 57.15 mm (2.25 in) at the bottom. All edges contacting the insulation material are rounded to a radius of 3.2 mm (0.125 in).

Deep-draw moldability of the airlaid insulation material of this invention was demonstrated by taking a 22 cm×30 cm piece of the 750 gsm pilot plant sample of 30/70 bico/fluff airlaid similar to that of Example 28, but which had been to 18.4 mm caliper, heating it in a convection oven set at 150° C. for 5 minutes, and then quickly placing it on a cold (ambient) milled aluminum die base. The die top was positioned and a pressure of 4.7 kg/cm² was applied to deform the material into the mold. The 750 gsm 18.4 mm caliper airlaid material was pressed into the mold without tearing of either the airlaid web or the spunbond carrier slipsheet and with only minor wrinkling. The control shoddy (1640 gsm and 25 mm caliper) was heated for 10 minutes in the 150° C. convection oven and subjected to the same molding conditions. The shoddy itself tore on one side and the nonwoven slipsheet ruptured.

Example 43

Fire Retardant Treated Airlaid Insulation Material

The laboratory handsheet apparatus was used to produce a 250 gsm airlaid pad which was 13 mm thick. The fiber composition used was 70 percent FOLEY FLUFFS® and 30 percent Trevira type T-255 number 1661 bicomponent binder fiber. To cure the bicomponent fiber, the pad was placed in a 150° C. convection oven for 15 minutes. The pad was cut into three samples 10.2×35.5 cm (4×14 inches). Each test strip was sprayed on each side with a 40 percent solids solution of fire retardant additive SPARTAN™ AR 295, a diammonium phosphate based flame retardant from Spartan Flame Retardants, Inc. of Crystal Lake, Ill. to a wet add-on of 5-10 gsm and placed in the 150° C. convection oven for a drying time of 1.0 minute. When tested for horizontal burning under the conditions of FMVSS-302, the samples burned for 50 seconds before self-extinguishing and the flame front traveled 64 mm (2.5 inches). To pass the horizontal burn test, the maximum burn rate is 101 mm/min over a maximum distance of 254 mm.

FMVSS 302 is the Federal Motor Vehicle Safety Standard No. 302 of the Department of Transportation, Flammability of Interior Materials: Passenger Cars, Multipurpose Passenger Vehicles, Trucks, and Buses Sep. 1, 1972. This standard specifies burn resistance requirements for materials used in the occupant compartments of motor vehicles. Its purpose is to reduce deaths and injuries to motor vehicle occupants caused by vehicle fires, especially those originating in the interior of the vehicle from sources such as matches or cigarettes.

Example 44

Fire Retardant and Binder Treated Airlaid Insulation Material

The laboratory handsheet apparatus was used to produce a 200 gsm airlaid pad which was 13 mm thick. The fiber composition used was 70 percent FOLEY FLUFFS® and 30 percent Trevira type T-255 number 1661 bicomponent binder fiber. The uncured 35.5 cm square pad (14 inch×14 inch) was placed over a vacuum box, and a 50/50 mixture of Fire Retardant, SPARTAN AR295 at 25 percent solids, and Latex Binder, AirFlex 192 at 24.8 percent solids, was sprayed onto one surface of the structure. The chemical add-on was 5.3 grams wet solution. (approximately 10 gsm dry add on). The pad was cured at 150° C. for 15 minutes.

A 12-mesh screen, 50 mm wide×300 mm long was placed over the non-chemically treated top surface of the sample as a flame arrestor. Then, when tested for horizontal burning under the conditions of FMVSS-302, the sample burned for 30 seconds before self-extinguishing and the flame front traveled 38 mm (1.5 inches).

Example 45

Water Repellant Airlaid Insulation

FOLEY FLUFFS® dry lap (pulp sheet) was cut into strips measuring 51 mm×102 mm (2 inches×4 inches) and sprayed with 10 percent by weight add-on of an emulsion containing 5 percent silicone oil, MAGNASOFT® Extra Emulsion by GE Silicones of Friendly, W. Va. The damp pulp strips were immediately fed into the laboratory three-stage fluffer until enough fluff was collected to make a 200 gsm airlaid pad on the laboratory handsheet former. The composition of the airlaid was 80 percent treated pulp and 20 percent Trevira T-255 number 1661 bicomponent fiber. The pad was placed in a 150° C. convection oven for 15 minutes to cure the bicomponent binder fiber. To test for water repellency, 51 mm (2 inches) square samples were cut, weighed, and soaked overnight in a bath of water. A wire screen was placed over the samples to hold them under the surface of the water. Control samples made from untreated FOLEY FLUFFS® were similarly weighed and soaked. After 24 hours the samples were carefully removed from the water bath and allowed to drain until the drip frequency was only about one drop per minute. The wet weights were recorded and the water absorbency in g/g calculated as the wet weight minus the dry weight divided by the dry weight. The results were the averages of the measurements on five samples of each type. The airlaid pad made from untreated fluff pulp absorbed 32 g/g while the airlaid from silicone-treated fluff pulp absorbed only 0.68 g/g, displaying a high degree of water repellency.

Example 46

Thermal Insulation

Airlaid pads were formed in the laboratory handsheet apparatus from a blend of 80 percent FOLEY FLUFFS® cellulose fluff pulp and 20 percent bicomponent fiber, Trevira type 255 Lot 1661. The pads were placed in a platen press heated to 150° C. and shimmed to a gap of 25 mm. A thermocouple was inserted into the middle of the pad halfway between the two sides and halfway between the edges. The time for the middle of the pad to reach a temperature of 140° C. was recorded.

TABLE 11

| Basis weight (gsm) | Density (g/cc) | Time to 140° C. (minutes) | Time normalized to 0.038 g/cc | Time Normalized to 973 gsm |
|---|---|---|---|---|
| 506 | 0.02 | 5 | 9.5 | 9.6 |
| 735 | 0.029 | 7.5 | 9.8 | 9.9 |
| 973 | 0.038 | 12.5 | 12.5 | 12.5 |
| 1243 | 0.05 | 10 | 7.6 | 7.8 |
| 1539 | 0.062 | 17.5 | 10.7 | 11.1 |
| 1939 | 0.078 | 24 | 11.7 | 12.0 |

Table 11 illustrates that a heavier batt of insulation takes longer to reach the target temperature. When the differences in basis weight are removed by normalizing all the results to a basis weight of 973 gsm, the differences in heating rate are very small, approaching random variation around a constant.

Examples 47-50

Commercial Scale Airlaid Machine

Examples 47-50 shown in Table 12 were made on a 2.8-meter wide multi-head commercial scale airlaid machine. Although the type of airlaid machine is not critical to this invention or the pad embodiments, Examples 47-50 were made on a machine with Dan-Web style forming heads. The fluff/bico ratio was 75/25 by weight. The cellulose fiber was FOLEY FLUFFS® treated, from Buckeye Technologies Inc. The treated designation refers to an additive to lower the disintegration energy of the pulp sheet. The bicomponent fiber was 2.0 denier and 6 mm cut length Type T-255 with merge number 1661, made by Trevira GmbH of Bobingen, Germany. This type of bico fiber has a polyethylene sheath over a polyester core. The sound and thermal insulating webs were formed on a 20 gsm polyester spunbond carrier supplied by BBA Fiberweb of Nashville, Tenn.

After leaving the forming section, one side of the webs was sprayed with a mixture of sodium tetraborate and zinc pyrithrione to add fire retardancy and mildew resistance (7.5 gsm borax and 0.5 gsm zinc pyrithrione dry add-on) and subsequently sprayed with an ethylene-vinyl acetate type latex binder (AIRFLEX® 192 from Air Products and Chemicals 5.0 gsm dry add-on) to lock in surface fibers. After passage through an oven, the other side of the webs was similarly treated and dried in a second oven.

Table 12 shows that the higher the basis weight of the web, the higher is the final density. Acoustic performance improves with thickness as expected. NISA is Normal Incidence Sound Absorption according to Test Method ASTM E1050-98. RISA is Random Incidence Sound Absorption according to Test Method ASTM C423-02a with ASTM E795-00 Type "A" mounting and the scrim or carrier side facing the sound source. STL is Sound Transmission Loss according to Test Method SAE J1400-90 with a 20 ga. steel panel facing the sound source. Example 48 was also submitted for horizontal flammability test MVSS-302 and was found to have a burning rate of 48 mm/min which was well under the maximum allowed rate of 100 mm/min.

TABLE 12

Examples 47-50—Commercial Scale Airlaid Machine Samples

| Example | Density (g/cc) | Caliper (mm) | Basis Weight (gsm) | NISA 1000 Hz | RISA NRC | STL-dB 2000 Hz |
|---|---|---|---|---|---|---|
| 47 | 0.026 | 9 | 230 | 0.109 | 0.30 | 37.4 |
| 48 | 0.030 | 17 | 510 | 0.231 | 0.50 | 39.3 |
| 49 | 0.038 | 20 | 760 | 0.339 | 0.60 | 41.0 |
| 50 | 0.038 | 28 | 1060 | 0.578 | 0.70 | 42.9 |

It is believed that the mechanism by which the airflow and conversely the airflow resistance of the airlaid structures of this invention is controlled in this airlaid process is that the small wood pulp fibers in the cellulose tissue trap or filter out droplets of the polymeric liquid binder thereby reducing the porosity of the tissue. This is illustrated in the following working examples where the airflow is significantly reduced by spraying an amount of liquid polymeric binder on the carrier side of the airlaid. The spray is drawn into and through the tissue by vacuum and capillary action. In addition to restricting the airflow through the tissue, the binder helps adhere the tissue to the airlaid.

Examples 51-64

Airlaid Structures

Fourteen airlaid structures were constructed using a laboratory pad-former that deposits individualized fibers onto a forming wire or nonwoven scrim or tissue carrier under vacuum. In this example, the resulting airlaid structure had a carrier tissue on one side. To form the airlaid structure, a single ply 18 gsm (grams per square meter) standard diaper carrier tissue of unknown maker was laid on the forming wire of the pad-former. The tissue is further characterized as having an airflow of 19.3 liters/sec (41 CFM), caliper of 0.07 mm, density of 0.254 g/cc, and MD tensile strength of 194 grams/cm with percent elongation of 19.25, and CD tensile strength of 111 grams/cm with elongation of 6.5 percent.

A 150 gsm airfelt was formed on the tissue in four increments of 3.65 grams cellulose fluff and 1.56 grams of bicomponent fiber. The pad was turned 90° after each addition to minimize formation irregularities. The composition of the airfelt was 70 percent cellulose fibers, available as FOLEY FLUFFS® LE+from Buckeye Technologies Inc., Memphis, Tenn., and 30 percent bicomponent binder fiber or bico fiber, Type T-255 2.0 denier and 6 n.m length. The airfelt and tissue were transferred to a cold laboratory press and compacted to about 0.05 g/cc density. The consolidated airlaid structure which measured 35.56 cm by 35.56 cm (14 inches by 14 inches) was trimmed to 30.5 by 35.56 cm (12 inches by 14 inches) and was placed in a heated (160° C.) laboratory press shimmed out to give a density range of 0.08-0.13 g/cc. The pads were held in the heated press for 15 minutes to fuse the bicomponent fiber. The airlaid structure was cut into four 15.24 cm (6 inch) squares. The airflow was measured on the untreated pads. The square samples were placed tissue side up on a vacuum box which had a 20 mesh stainless steel screen, and which was connected to the suction side of a 6.5 horsepower wet/dry vacuum cleaner. The tissue sides of the pads were sprayed with various polymeric binders and dried for 10 minutes in a 105-110° C. convection oven. The dry samples were weighed to calculate the actual add-on and measured for caliper (thickness) to calculate the density. The airflow after treatment was then measured.

Examples 51 through 60 were formed on a standard cellulosic tissue of about 20 gsm. Examples 61 and 62 were formed on Shawano Tissue product 3528, an 18 gsm reduced permeability tissue supplied by Shawano Specialty Paper of Shawano, Wis. Examples 63 and 64 were formed on Cellu Tissue 3205FQP, a 17 gsm reduced permeability tissue from Cellu Tissue Holdings Inc. of East Hartford, Conn. The percent solids of the binder may influence the permeability of the resulting composite. For example, in Example 63, the binder was sprayed at 15 percent solids and 34 gsm add-on produced an air flow of 13.6 liters/sec, while in Example 64 giving just 4.8 liters/sec for 33 gsm add-on the percent solids of the binder was 19.7 percent.

As also shown in Table 13, the measured airflow values through the pairs of similarly prepared and treated composites dropped when the amount of binder applied to the tissue sides was increased. The effect is not particularly dependent on the type of binder, as several different emulsion polymers and even a solution polymer (the polyvinyl alcohol) were effective in reducing the airflow. In general, tissue/airlaid composites with lower initial airflow required less binder to further reduce the airflow.

The binders used in this set of working examples are described as follows: AIRFLEX®-192 an ethylene vinyl acetate copolymer and VINAC® DP912 a vinyl acetate polymer by Air Products Polymers, L. P. of Allentown, Pa.; TYLAC® 873 carboxylated acrylonitrile-butadiene resin by Dow-Reichhold Specialty Latex LLC of Research Triangle Park, N.C.; and DUR-O-SET® 24-351A ethylene vinyl acetate and CELVOL® 24-203 poly(vinyl alcohol) by Celanese (formerly National Starch and Chemical) of Bridgewater, N.J. The MKS Rayls expression of airflow resistance was calculated from the measured airflow.

TABLE 13

Controlled Airflow

| Ex. | Tissue | Initial Airflow (liters/s) | Binder | Add-on (gsm) | Caliper (mm) | Basis Wt. gsm | Density g/cc | Final Airflow (liters/s) | Rayls N-S/m³ |
|---|---|---|---|---|---|---|---|---|---|
| 51 | Std. | 20.0 | AIRFLEX ® | 16.7 | 1.81 | 196 | 0.11 | 6.0 | 1915 |
| 52 | Std. | 15.0 | AIRFLEX ® | 13.9 | 1.94 | 198 | 0.10 | 9.9 | 1167 |
| 53 | Std. | 19.6 | TYLAC ® | 18.6 | 2.37 | 195 | 0.08 | 1.8 | 6452 |
| 54 | Std. | 15.4 | TYLAC ® | 15.7 | 1.54 | 204 | 0.13 | 4.4 | 2636 |
| 55 | Std. | 19.0 | VINAC ® | 17.9 | 2.37 | 199 | 0.08 | 3.0 | 3831 |
| 56 | Std. | 15.8 | VINAC ® | 15.4 | 1.61 | 201 | 0.12 | 4.2 | 2724 |
| 57 | Std. | 16.5 | 25-351A | 14.3 | 1.78 | 195 | 0.11 | 8.3 | 1393 |
| 58 | Std. | 16.1 | 25-351A | 7.12 | 1.80 | 181 | 0.10 | 13.3 | 872 |
| 59 | Std. | 16.5 | CELVOL ® | 13.7 | 1.97 | 183 | 0.09 | 2.5 | 4540 |
| 60 | Std. | 16.2 | CELVOL ® | 6.8 | 1.82 | 190 | 0.10 | 8.7 | 1332 |
| 61 | Sh | — | AIRFLEX ® | 11 | 3.0 | 139 | 0.05 | 10.3 | 1150 |
| 62 | Sh | 19.5 | AIRFLEX ® | 23 | 3.0 | 183 | 0.06 | 3.0 | 3890 |
| 63 | CT | 59.6 | AIRFLEX ® | 34 | 3 | 160 | 0.06 | 13.6 | 850 |
| 64 | CT | — | AIRFLEX ® | 33 | 3.2 | 163 | 0.05 | 4.8 | 2400 |

Examples 65-69

Laminating Adhesive Layer

A 12.5 mm thick 420 gsm airlaid pad with a fluff/bico ratio of 75/25 and having 5 gsm of latex binder sprayed on each side was formed on a 20 gsm polyester spunbond scrim on a 2.8-meter wide multi-head commercial scale Dan-Web style airlaid machine. The cellulose fiber was FOLEY FLUFFS® treated, from Buckeye Technologies, Inc. The treated designation refers to an additive to lower the disintegration energy of the pulp sheet. The bicomponent fiber was Trevira 1661 Type 255 2.0 dpf and 6 mm length. The polyester spunbond carrier was supplied by BBA Fiberweb of Nashville, Tenn.

The composite airlaid pad had a basis weight of about 420 gsm, including the polyester spunbond scrim. The pad was treated on the side opposite the scrim with different amounts of various non-crosslinking and thermoplastic latex binders. After drying in a 150° C. oven for 5 minutes, the samples or pad was cut into 102 mm by 102 mm (4 inch) squares to form different test samples. The samples were then placed in a 172° C. oven along with an untreated sample for 2 minutes. The hot samples were pressed together with the scrim side of the untreated sample toward the treated side of the other sample. A pressure of approximately 0.809 kilograms-force/cm2 (11.5 psi) was applied for 45 seconds to bond the samples together. Each sample was die-cut into three strips each 25.4 mm by 102 mm (1.0 by 4.0 inch).

The strength of the bond (treated airlaid side to untreated carrier side) was measured by pulling the layers apart using a tensile tester (Twing-Albert Model QC1000) and a crosshead speed of 110 mm/min. The force needed to de-laminate the samples at the point of adhesion increased with the percent add-on of adhesive binders over the range studied. Examples 65 to 69 demonstrate that the airlaid acoustic absorbent of this invention can bond to a dissimilar material under heat and pressure such as might be employed in assembling a carpet and padding for an automobile. As shown in Table 14, the glass transition temperature of the adhesive was not a factor in bond strength. However, having some vinyl acetate in the polymer backbone appeared to contribute to stronger adhesion of the treated airlaid side of the composite to the untreated scrim side, at least with the Air Products binders.

The binders used in this set of working examples are described as follows:

25-351A=DURO-SET® 351A—an ethylene-vinyl acetate latex from Celanese 25-4401=NACRYLIC® 4401—an acrylic latex from Celanese;

AF4500=AIRFLEX® 4500—an ethylene-vinyl chloride latex from Air Products Polymers L.P.;

AF410=AIRFLEX® 410—an ethylene-vinyl acetate latex from Air Products Polymers L.P.; and EF9100=VINAC® 9100—a vinyl acetate latex from Air Products Polymers L.P.

TABLE 14

Examples 65-69—Thermoplastic Adhesives

| Example | Binder Code | Binder Type | Binder Tg ° C. | Delaminating Strength in Grams at Varying Binder Add-on | | | | |
|---|---|---|---|---|---|---|---|---|
| | | | | 5 gsm | 10 gsm | 15 gsm | 20 gsm | 25 gsm |
| 65 | 25-351A | EVA | 0 | 97 | 108 | 112 | 151 | 142 |
| 66 | 25-4401 | Acrylic | −23 | 80 | 95 | 93 | 112 | 156 |
| 67 | AF4500 | EVCl | 3 | 59.3 | 87.3 | 121.3 | 131.3 | 164.7 |
| 68 | AF410 | EVA | 4 | 68.3 | 102.3 | 138.7 | 173.3 | 220.3 |
| 69 | EF9100 | Vac | −30 | 78 | 112 | 162 | 248 | 352 |

Examples 70-77

Stiff Composites

The same 420 gsm airlaid pad produced on the commercial airlaid machine for the previous examples was compressed to 6 mm thickness in a 160° C. heated press for 10 minutes, allowed to cool to room temperature, and then was sprayed one side at a time with approximately 25 percent solids latex binder to an add-on of 15 gsm (solids basis) and then dried in a 172° C. oven for 15 minutes. After both sides were treated, the caliper was reset to 6 mm by 5 minutes in the 160° C. heated press. The cooled composites with density of 0.06 g/cc were cut into strips 50.8 mm by 254 mm (2 by 10 inches) and tested in the Model QC100 Twing-Albert Tensile Tester in Compression to Distance mode using a 100N load cell with the sample support rods spaced 200 mm apart and the carrier side up. The work was repeated beginning with a 780 gsm airlaid having an initial thickness of 21 mm to yield composites having density of 0.13 g/cc. A 500 N load cell was needed in the Twing-Albert for the denser samples.

The binders were supplied as follows:
RHOPLEX® line of acrylic binders by Rohm & Haas Chemicals, LLC of Charlotte, N.C.;
TYLAC® (carboxylated styrene-butadiene-acrylonitrile copolymer) from Dow Reichhold Specialty latex LLC of Research Triangle Park, N.C.; and
ROVENE® (carboxylated styrene-butadiene rubber) from Mallard Creek Polymers, Inc. of Charlotte, N.C.

TABLE 15

Composite Stiffness

Grams of Deflection Resistance vs. Density

| Example | Sample | 0.07 g/cc | 0.13 g/cc |
|---|---|---|---|
| 70 | Control no carrier | 62.2 | 323.6 |
| 71 | Control | 88.7 | 371.8 |
| 72 | Rhoplex ® ECO 4015 | 115.1 | 431 |
| 73 | Tylac ® 68957-000 | 116.7 | 426.3 |
| 74 | Rhoplex ® GL-720 | 126.0 | 454.3 |
| 75 | Rovene ® RX 50660-18 | 127.6 | 553.9 |
| 76 | Rhoplex ® TR 407/GL 720 | 140.0 | 449.6 |
| 77 | Rhoplex ® GL-730 | 143.1 | 431 |

What is apparent from the data in Table 15 is that different binders are more suited for different densities of airlaid pads. The stiffest binders for the low density composite were the RHOPLEX® GL-720 and the blend of RHOPLEX® TR 407 and GL-720. With the 0.13 g/cc sample series, the binder yielding the stiffest sample was ROVENE® RX 50660-18. The others were essentially comparable.

Example 78

Basic Airlaid Structure for Scrim

An airlaid structure was constructed using a laboratory pad-former that deposits individualized fibers on a forming wire or nonwoven scrim carrier under vacuum. The resulting airlaid structure has a scrim on one side and an airfelt pad on the other. In the following examples, the forming wire was masked off to an area of 25.4 cm (10 inches) by 35.56 cm (14 inches). To form the airlaid structure, a 17 gsm (grams per square meter) polypropylene nonwoven scrim, which was a spunbond-meltblown-spunbond (SMS) type 350939 made by BBA Fiberweb of Old Hickory, Tenn., was laid on the forming wire of the pad-former. A 100 gsm airfelt base pad was formed on the scrim in four increments of 1.92 grams cellulose fluff and 0.34 grams of bicomponent fiber, turning the pad 90° after each addition to minimize formation irregularities. The composition of the airfelt was 85 percent cellulose fibers, available as FOLEY FLUFFS® from Buckeye Technologies Inc., and 15 percent bicomponent binder fiber or bico fiber, Type T-255 with merge number 1661, which had a 2.0 denier and 6 mm length, made by Trevira GmbH of Bobingen, Germany, and which had a polyethylene sheath over a polypropylene core.

The airfelt material and scrim were carefully transferred to a cold laboratory press and compacted to about 2 mm thickness. The consolidated airlaid structure was placed scrim-side down over a vacuum box which had a 20 mesh stainless steel screen, and which was connected to the suction side of a 6.5 horsepower wet/dry vacuum cleaner. The airfelt side of the entire pad was sprayed with 1.75 grams of a 24.96 percent solution of sodium tetraborate decahydrate from U.S. Borax Inc. of Valencia, Calif., and then sprayed again with 4.08 grams of a 9.65 percent solids aqueous ethylene vinyl acetate (EVA) latex, AIRFLEX® 192 made by Air Products Polymers L.P. The airlaid structure was then dried for 5 minutes in a 105° C. convection oven. The calculated add-on levels were 4.83 gsm borax and 4.36 gsm latex binder.

Example 79

Airlaid Structure with 793 Rayls (N-S/m³) Airflow Resistance

The basic airlaid structure formed in Example 1 was cut into two pieces each trimmed to 16.5 by 25.4 cm (6.5 by 10 inches). The first piece was sprayed on the SMS scrim side with 2.56 grams of the 24.96 percent solution of sodium tetraborate decahydrate and with 2.49 grams of the 9.65 percent dispersion of AIRFLEX® 192. The airlaid structure was then transferred to a laboratory press preheated to 160° C. The press was shimmed to about 1.5 mm and closed on the pad with a pressure of 12,410 Kilopascals (1800 psi) for 10 minutes. This served to evaporate the water and then to melt the sheath of the bicomponent binder fiber and thereby stabilize the airlaid structure. This airlaid structure had a final weight of 6.05 grams, a basis weight of 144.3 gsm, a thickness of 1.67 mm and a density of 0.086 g/cc.

The airflow of the airlaid structure was measured. Measurements were taken using a self-calibrating Permtest Model MK4 portable tester made by Metso Paper Inc. of Turku, Finland. To take a reading, the sample was placed on a test stand, which was a highly perforated 20 cm² steel plate raised 25 mm from the surface of a table and having approximately 90 percent open area. Three readings were taken and the results averaged. The instrument had an operating range of 0.9-410 liters/sec (2-870 cfm). It was found that the pad or airlaid structure had an airflow of 14.6 liters/sec (30.9 cfm) corresponding to airflow resistance of 793 NS/m³ Rayls.

Example 80

Airlaid Structure with 1817 Rayls Airflow Resistance

Another 16.5 by 25.4 cm (6.5 by 10 inches) piece of the basic airlaid structure was sprayed on the SMS scrim side with 2.88 grams of the 24.93 percent solution of borax and 4.83 grams of 9.65 percent AIRFLEX® 192 latex binder. The airlaid structure was dried and cured at 160° C. for 10 minutes as before to give a dry add-on of 17.14 gsm borax and 11.11 gsm latex binder. The final structure weighed 6.3 grams and had a basis weight 150.2 gsm, a thickness of 1.77 mm, a density of 0.085 g/cc, and exhibited airflow of 6.4 liters/sec (13.6 cfm) or 1817 Rayls airflow resistance.

Example 81

Airlaid Structure with 9806 Rayls Airflow Resistance

In this example, a 17 gsm SMMS (spunbond-meltblown-meltblown-spunbond) scrim from Avgol Nonwoven Industries, Tel Aviv, Israel was used as the carrier sheet and an airlaid structure was formed thereon in four stages as in the previous examples. The airfelt had a basis weight of 100 gsm and was made of 85 gsm of FOLEY FLUFFS® and 15 gsm Type T-255 bico. The forming wire was masked off to an area which was 30.5×33 cm (12×13 inches) and the airlaid structure that was formed weighed 12.45 grams and had a basis weight of 124 gsm. The composite structure or pad was placed on the vacuum box with the scrim side down. The open airfelt side was sprayed with 3.62 grams of a 25 percent solution of borax, followed by 2.06 grams of 25 percent AIRFLEX® 192. It was then dried for 5 minutes in the 105° C. convection oven. The add-ons were calculated to be 11.8 gsm borax and 5.1 gsm latex. The airlaid structure was turned over, returned to the vacuum box, and the SMMS side sprayed with 2.91 grams of the borax solution and 9.6 grams of the latex. After drying and curing in the heated press, the borax add-on to the scrim side was 9.5 gsm and the latex add-on was 23.8 gsm. The final airlaid structure weighed 18.8 grams and had a basis weight of 187 gsm, a thickness 1.73 mm, and a density 0.108 g/cc.

The air flow of this airlaid structure was also measured. It was found that the air flow was 1.18 liters/sec (2.5 cfm), corresponding to 9806 Rayls airflow resistance.

What is claimed is:

1. Nonwoven material comprising a core, containing:
   (A) from about 95 weight percent to about 40 weight percent matrix fibers, wherein the matrix fibers comprise individualized cellulosic fibers,
   (B) from about 60 weight percent to about 5 weight percent core binder, where weight percentages in the core are based on the total weight of the core, and where
   (C) the core has a basis weight of from about 200 gsm to about 3000 gsm,
   (D) the core has a density of from about 0.015 g/cc to about 0.10 g/cc, and
   (E) the nonwoven material has sound transmission reduction of 5 decibel or greater in an LSTT sound transmission test.

2. The nonwoven material of claim 1, wherein the matrix fibers further comprise synthetic fibers.

3. A panel of the nonwoven material of claim 1, having an area of up to 1000 meters square, which has been formed from a continuous process, slit to a desired width, and rolled in a manner suitable for shipping by truck or by rail.

4. The nonwoven material of claim 1, wherein the core binder is a bicomponent fiber binder, a latex binder, a thermoplastic powder or a mixture thereof.

5. The nonwoven material of claim 4, wherein the core binder is a bicomponent fiber.

6. The nonwoven material of claim 4, wherein the core binder is a latex binder.

7. The nonwoven material of claim 4, wherein the core binder is a thermoplastic powder.

8. The nonwoven material of claim 4, wherein the core binder is a polyolefin in powder, chip or granular form.

9. The nonwoven material of claim 4, wherein the core binder is a mixture of a bicomponent fiber binder and a latex binder.

10. The nonwoven material of claim 1, wherein the basis weight of the core is from about 300 gsm to about 3000 gsm.

11. The nonwoven material of claim 1, wherein the density is from about 0.015 g/cc to about 0.08 g/cc.

12. The nonwoven material of claim 1, wherein the nonwoven material has sound transmission reduction of 7 decibel or greater in a LSTT sound transmission test.

13. The nonwoven material of claim 1, wherein the core contains:
   (A) from about 90 weight percent to about 55 weight percent matrix fibers, and
   (B) from about 45 weight percent to about 10 weight percent core binder, where weight percentages in the core are based on the total weight of the core.

14. The nonwoven material of claim 1, wherein the core contains
   (A) from about 80 weight percent to about 60 weight percent matrix fibers, and
   (B) from about 40 weight percent to about 20 weight percent core binder, where weight percentages in the core are based on the total weight of the core.

15. The nonwoven material of claim 1, further comprising:
   (F) a woven or nonwoven carrier with a basis weight of from about 10 gsm to about 2000 gsm which is integral with a surface of the core.

16. The nonwoven material of claim 15, wherein the carrier is a nonwoven carrier containing synthetic fibers, cellulosic fibers or a mixture thereof.

17. The nonwoven material of claim 16, wherein the carrier is a synthetic spunbonded, meltblown or spunlaced carrier.

18. The nonwoven material of claim 16, wherein the carrier is a cellulosic carrier.

19. The nonwoven material of claim 15, wherein the carrier is a woven carrier containing synthetic fibers, cellulosic fibers or a mixture thereof.

20. The nonwoven material of claim 15, wherein the carrier is a woven carrier which is a cloth, textile, unbacked carpeting, or other woven material.

21. The nonwoven material of claim 1, further comprising:
   (G) an auxiliary layer containing plastic material with a basis weight of from about 50 gsm to about 700 gsm present on an outer surface of the nonwoven material or present as a discrete inner layer within the core of the nonwoven material.

22. The nonwoven material of claim 21, wherein the auxiliary layer contains a dense filler material having a density of greater than 0.1 g/cc, and has a basis weight of from about 75 gsm to about 700 gsm.

23. The nonwoven material of claim 22, wherein the auxiliary layer has a basis weight of from about 150 gsm to about 700 gsm.

24. The nonwoven material of one of claim 21, wherein the auxiliary layer is made from one or more latices.

25. The nonwoven material of claim 21, wherein the auxiliary layer is made from one or more latices and a filler.

26. The nonwoven material of claim 25, wherein the filler is calcium carbonate, barium sulfate, or a mixture thereof.

27. The nonwoven material of claim 21, wherein the auxiliary layer contains one or more thermoplastic fibers.

28. The nonwoven material of claim 21, wherein the auxiliary layer contains one or more hot melt adhesives.

29. The nonwoven material of claim 21, wherein the auxiliary layer contains from about 30 weight percent to 100 weight percent latex solids, and from 0 to about 70 weight percent filler.

30. The nonwoven material of claim 1, wherein the nonwoven material has a sound absorption coefficient ($\alpha$) as determined by ASTM E1 050-98 at 1000 Hz of about 0.5 or greater.

31. The nonwoven material of claim 17, wherein the nonwoven material has a sound absorption coefficient (a) as determined by ASTM E 1050-98 at 2500 Hz of about 0.85 or greater.

32. The nonwoven material of claim 1 further comprising (I) a waterproofing agent.

33. The nonwoven material of claim 1, wherein the nonwoven material has a SAMI of about 3 $\delta$dB/kgsm or greater.

34. A panel of the nonwoven material of claim 1, having an area of 50 meters square or less, which has been molded with an application of heat and pressure into a shape which is retained.

35. A panel of the nonwoven material of claim 1, having an area of 10 meters square or less, which has been formed from a continuous process and cut into a long roll suitable for shipping by truck or by rail.

36. A thermal insulating construct comprising a structural member or surface of a building, a vehicle, or an appliance and attached or applied thereto a nonwoven material of claim 1.

37. The thermal insulating construct of claim 36, wherein the core of the nonwoven material comprises:
(J) fibers dosed with fibers, granules or microcapsules that can store heat or cold for later release.

38. A sound attenuating laminate comprising the nonwoven material of claim 1, and attached or applied thereto or otherwise in contact therewith upholstery material, carpeting or a structural member or surface.

39. A panel of the sound attenuating laminate of claim 38, which has been molded with the application of heat and pressure into a shape which is retained.

40. A package for an object comprising a container and a nonwoven material of claim 1.

41. A process for the production of a nonwoven material comprising:
(1a) on a moving foraminous wire from one or more forming heads deposition of a mixture containing
(A) from about 95 weight percent to about 40 weight percent matrix fibers, wherein the matrix fibers comprise individualized cellulosic fibers,
(B) from about 60 weight percent to about 5 weight percent core binder, to form a core of the nonwoven material, where weight percentages in the core are based on the total weight of the core, followed by
(2a) heating the nonwoven material to consolidate the mixture of matrix fibers and binder, or,
(1b) deposition on a moving foraminous wire of
(A) a woven or nonwoven carrier with a basis weight of from about 10 gsm to about 2000 gsm; followed by
(2b) deposition on the carrier from one or more forming heads of a mixture containing
(B) from about 95 weight percent to about 40 weight percent matrix fibers, and
(C) from about 60 weight percent to about 5 weight percent core binder, to form a core of the nonwoven material, where weight percentages in the core are based on the total weight of the core, and so that the carrier is integral with a surface of the core, followed by
(3) heating the nonwoven material to consolidate the mixture of matrix fibers and binder, where
(D) the core has a basis weight of from about 200 gsm to about 3000 gsm,
(E) the core has a density of from about 0.015 g/cc to about 0.10 g/cc, and
(F) the nonwoven material has sound transmission reduction of 5 decibel or greater in an LSTT sound transmission test.

42. The process of claim 41, further comprising the step of:
(4) forming an auxiliary layer containing plastic material with a basis weight of from about 50 gsm to about 700 gsm present on an outer surface of the core or present as a discrete inner layer within the core.

43. The process of claim 42, wherein the auxiliary layer contains plastic material and a filler.

44. The process of claim 42, wherein the auxiliary layer is produced at an outer surface of the nonwoven material by hot calendaring or by radiant heating of a surface layer of the nonwoven material.

45. The process claim 41, wherein the process is a continuous process.

46. A process for providing sound attenuation or thermal insulation in a building or vehicle comprising:
(A) providing a structural cavity or surface of the building or vehicle, and
(B) applying or attaching thereto a nonwoven material of claim 41.

47. A molded thermal insulating article, comprising:
a nonwoven material including a core that has a basis weight of from about 200 gsm to about 3000 gsm, the core containing (A) from about 95 weight percent to about 40 weight percent matrix fibers, wherein the matrix fibers comprise individualized cellulosic fibers, (B) from about 60 weight percent to about 5 weight percent core binder, where weight percentages in the core are based on the total weight of the core; and a fire retardant;
wherein the thermal insulating article is molded into a predetermined shape that complementary to the at least one vehicle part.

48. The molded thermal insulating article of claim 47, wherein the at least one vehicle part is selected from the group consisting of a dash board, an engine side wall, a hood, a door panel, a trunk compartment, a passenger floor, a package tray, and an interior wheel well.

49. A vehicle insulating article comprising: an airlaid structure formed of a nonwoven material including a core that has a basis weight of from about 200 gsm to about 3000 gsm, the core containing (A) from about 95 weight percent to about 40 weight percent matrix fibers, wherein the matrix fibers comprise individualized cellulosic fibers, (B) from about 60 weight percent to about 5 weight percent core binder, where weight percentages in the core are based on the total weight of the core.

50. A sound attenuating insulating article comprising:
a nonwoven material comprising a core that has a basis weight of from about 200 gsm to about 3000 gsm, the core containing (A) from about 95 weight percent to about 40 weight percent matrix fibers, wherein the matrix fibers comprise individualized cellulosic fibers, (B) from about 60 weight percent to about 5 weight percent core binder, where weight percentages in the core are based on the total weight of the core; and
a decorative outer layer formed of a material that is different than the nonwoven material and has increased rigidity compared to the nonwoven core.

51. The sound attenuating insulating article of claim 50, wherein the article comprises a ceiling tile and the decorative outer layer has indicia formed as a part thereof.

52. The sound attenuating insulating article of claim 51, wherein the indicia comprises one of a stippled pattern, a decorative pattern embossed thereon, and a roughened surface.

53. The sound attenuating insulating article of claim 51, wherein the decorative outer layer is formed of a synthetic material.

54. The sound attenuating insulating article of claim 53, wherein the synthetic material is a layer of plastic material disposed on the core.

55. The sound attenuating insulating article of claim 50, wherein the article is cut into square shaped tiles.

56. The sound attenuating insulating article of claim 50, wherein the decorative outer layer further includes an agent that inhibits surface growth of mold and mildew.

57. A molded article having a shape of a vehicle insulating panel insert comprising:
   an airlaid structure formed of a nonwoven material and a core containing:
   From about 95 weight percent to about 40 weight percent matrix fibers, wherein the matrix fibers comprise individualized cellulosic fibers, and
   From about 60 weight percent to about 5 weight percent core binder, where weight percentages in the core are based on the total weight of the core;
   wherein the article is molded into a shape that is retained, the nonwoven material having sound transmission reduction of 5 decibel or greater in an LSTT sound transmission test, a substrate bonded to the airlaid structure.

58. The article of claim 57, wherein the airlaid structure includes an opening formed therein to receive a vehicle part.

59. The article of claim 57, wherein the substrate is selected from the group consisting of a carpet, a heavy paper board support member, and a plastic support member.

60. The molded article of claim 58, wherein the insert is selected from the group consisting of a dashboard insert, a wheel well insert, an engine firewall insert, a door insert, a floor insert, a trunk insert and a hood underside insert.

61. A nonwoven structure comprising:
   (A) a scrim with an interior surface and an outer surface, the scrim having a basis weight of from about 8 gsm to about 200 gsm; and,
   (B) in contact with the interior surface of the scrim, an interior surface of a nonwoven material with an interior surface and an outer surface, the nonwoven material having a basis weight of from about 10 gsm to about 2000 gsm which contains from about 30 weight percent to about 95 weight percent matrix fibers, wherein the matrix fibers comprise individualized cellulosic fibers, and from about 5 weight percent to about 70 weight percent of a binder where the weight percentages are based on the total weight of the nonwoven material; and
   (C) deposited on the outer surface of the scrim from about 1 gsm to about 40 gsm of a polymeric coating; and, optionally,
   (D) deposited on the outer surface of the nonwoven material from about 1 gsm to about 40 gsm of a second polymeric coating.

62. The nonwoven structure of claim 61, wherein the basis weight of the scrim is from about 8 gsm to about 100 gsm.

63. The nonwoven structure of claim 61, wherein the nonwoven material has a basis weight of from about 10 gsm to about 1000 gsm.

64. The nonwoven structure of claim 61, wherein the basis weight of the polymeric coating deposited on the outer surface of the scrim is from about 1 gsm to about 25 gsm.

65. The nonwoven structure of claim 61, wherein the basis weight of the polymeric coating deposited on the outer surface of the scrim is from about 5 gsm to about 40 gsm.

66. The nonwoven structure of claim 61, wherein the second polymeric coating is present and the basis weight of the second polymeric coating deposited on the outer surface of the nonwoven material is from about 1 gsm to about 25 gsm.

67. The nonwoven structure of claim 61, wherein the basis weight of the second polymeric coating deposited on the outer surface of the nonwoven material is from about 5 gsm to about 40 gsm.

68. The nonwoven structure of claim 61, wherein the polymeric coating deposited on the outer surface of the scrim or the second polymeric coating deposited on the outer surface of the nonwoven material or both contains or binds one or more fillers, powders, or fire retardants.

69. The nonwoven structure of claim 68, wherein the fire retardant is sodium tetraborate or a hydrate thereof.

70. The nonwoven structure of claim 61, wherein the nonwoven material is an airfelt.

71. The nonwoven structure of claim 61, wherein the nonwoven structure is an airlaid nonwoven structure.

72. The nonwoven structure of claim 61, wherein the caliper of the nonwoven structure is from about 1 mm to about 60 mm.

73. The nonwoven structure of claim 61, wherein the nonwoven structure has an airflow resistance of from about 500 to about 10,000 Rayls (NS/m3).

74. The nonwoven structure of claim 61, wherein the scrim is fabricated from a woven material selected from the group comprising cloth, unbacked carpet and textile.

75. The nonwoven structure of claim 61, wherein the scrim is fabricated from a nonwoven material that is needle-punched, spunlaid or spunbonded.

76. The nonwoven structure of claim 75, wherein the scrim is a spunbonded polypropylene being 15 to 500 g/m2 by weight.

77. The nonwoven structure of claim 75, wherein the scrim is fabricated from a spunbonded process, a meltblown process or a spunlaced process.

78. The nonwoven structure of claim 61, wherein the matrix fibers are cellulose fibers or cellulose fibers blended with synthetic fibers.

79. A nonwoven structure comprising:
   (A) a scrim with a first surface and a second surface, the scrim having a basis weight of from about 8 gsm to about 200 gsm;
   (B) deposited on the first surface of the scrim, from about 1 gsm to about 40 gsm of a polymeric coating; and, optionally,
   (C) deposited on the second surface of the scrim from about 1 gsm to about 40 gsm of a second polymeric coating;
   Wherein the structure comprises a core, containing
   (D) From about 95 weight percent to about 40 weight percent matrix fibers, wherein the matrix fibers comprise individualized cellulosic fibers, and
   (E) From about 60 weight percent to about 5 weight percent core binder, where weight percentages in the core are based on the total weight of the core.

80. The nonwoven structure of claim 79, wherein the scrim is a spunbond-meltblown-spunbond material, a spunbond-meltblown-meltblown-spunbond material, a cellulosic material, a textile, or woven or nonwoven polyester material.

81. A process for the production of a nonwoven structure, comprising;
(1) providing a scrim with an interior surface and an outer surface, the scrim having a basis weight of from about 8 gsm to about 200 gsm;
(2) airlaying a nonwoven material on the interior surface of the scrim, the nonwoven material having a basis weight of from about 10 gsm to about 2000 gsm which contains from about 30 weight percent to about 95 weight percent matrix fibers, wherein the matrix fibers comprise individualized cellulosic fibers, and from about 5 weight percent to about 70 weight percent of a binder where the weight percentages are based on the total weight of the nonwoven material;
(3) depositing on the outer surface of the scrim from about 1 gsm to about 40 gsm of a polymeric coating; and, optionally,
(4) depositing on the outer surface of the nonwoven material from about 1 gsm to about 40 gsm of a second polymeric coating.

82. A motorized vehicle barrier, the barrier being at least partially insulated by a nonwoven structure, comprising:
(A) a scrim with an interior surface and an outer surface, the scrim having a basis weight of from about 8 gsm to about 200 gsm; and
(B) in contact with the interior surface of the scrim, an interior surface of a nonwoven material having an interior surface and an outer surface, the material having a basis weight of from about 10 gsm to about 2000 gsm which contains from about 30 weight percent to about 95 weight percent matrix fibers and from about 5 weight percent to about 70 weight percent of a binder where the weight percentages are based on the total weight of the pad; and
(C) deposited on the outer surface of the scrim, from about 1 gsm to about 40 gsm of a polymeric coating; and, optionally,
(D) deposited on the outer surface of the nonwoven material from about 1 gsm to about 40 gsm of a second polymeric coating; and the nonwoven structure being pre-cut to a desired geometry before installation into the barrier.

83. The motorized vehicle of claim 82, wherein the barrier is a door.

* * * * *